US008694725B2

(12) United States Patent
Taguchi et al.

(10) Patent No.: US 8,694,725 B2
(45) Date of Patent: *Apr. 8, 2014

(54) STORAGE SYSTEM AND CONTROL METHOD THEREOF AS WELL AS PROGRAM

(71) Applicant: Hitachi, Ltd., Tokyo (JP)

(72) Inventors: Yuichi Taguchi, Sagamihara (JP); Shinichi Hayashi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,419

(22) Filed: Dec. 5, 2012

(65) Prior Publication Data

US 2013/0097378 A1    Apr. 18, 2013

Related U.S. Application Data

(63) Continuation of application No. 12/526,620, filed as application No. PCT/JP2009/001713 on Apr. 14, 2009, now Pat. No. 8,347,031.

(51) Int. Cl.
*G06F 3/06* (2006.01)

(52) U.S. Cl.
CPC .................................. *G06F 3/067* (2013.01)
USPC ........................................................ 711/114

(58) Field of Classification Search
None
See application file for complete search history.

(56) References Cited

U.S. PATENT DOCUMENTS

| | | | |
|---|---|---|---|
| 6,234,599 B1 | 5/2001 | Ishinaga et al. | |
| 6,418,510 B1 | 7/2002 | Lamberts | |
| 2005/0210067 A1 | 9/2005 | Nakatani et al. | |
| 2005/0210074 A1 | 9/2005 | Nakatani et al. | |
| 2005/0262386 A1 | 11/2005 | Numanoi | |
| 2007/0136522 A1 | 6/2007 | Umemura et al. | |
| 2007/0168565 A1 | 7/2007 | Yuhara et al. | |
| 2007/0168598 A1 | 7/2007 | Yamamoto et al. | |
| 2008/0056300 A1 | 3/2008 | Williams | |
| 2009/0086637 A1 | 4/2009 | DeCusatis et al. | |
| 2011/0231604 A1 | 9/2011 | Taguchi et al. | |

FOREIGN PATENT DOCUMENTS

| | | |
|---|---|---|
| CN | 1671134 A | 9/2005 |
| EP | 1517230 A2 | 3/2005 |
| JP | 05197502 | 8/1993 |
| JP | 07281836 | 10/1995 |
| JP | 200511277 | 1/2005 |
| JP | 2005309748 | 11/2005 |
| JP | 2007157011 | 6/2007 |
| JP | 2007179156 | 7/2007 |
| WO | 2006047194 A2 | 5/2006 |

OTHER PUBLICATIONS

"Fibre Channel over Ethernet (registered trademark) in the Data Center", Fibre Channel Industry Association, 2007.

*Primary Examiner* — Kevin Verbrugge
(74) *Attorney, Agent, or Firm* — Brundidge & Stanger, P.C.

(57) ABSTRACT

In a storage system in which computers are connected via a network, in order to avoid a state where communication quality is degraded due to poor performance of an apparatus constituting the network, for a transfer data amount, an amount of data sent out from a storage apparatus is suppressed. Moreover, the storage apparatus inhibits a read-ahead process, in accordance with the suppression of the sending out of the data. Furthermore, proper load allocation is realized by migrating a logical storage unit provided by the storage, to another network interface or a second storage apparatus, without changing a configuration of the network.

13 Claims, 32 Drawing Sheets

FIG. 10

| RAID GROUP IDENTIFICATION INFORMATION | DISK DRIVE IDENTIFICATION INFORMATION | | | |
|---|---|---|---|---|
| | #1 | #2 | #3 | #4 |
| RG#01 | HD#01 | HD#02 | HD#03 | HD#04 |
| RG#02 | HD#11 | HD#12 | HD#13 | HD#14 |
| ... | ... | ... | ... | ... |

| LOGICAL STORAGE AREA IDENTIFICATION INFORMATION | RAID GROUP IDENTIFICATION INFORMATION | EXTERNAL STORAGE INFORMATION | | ADDRESS RANGE | |
|---|---|---|---|---|---|
| | | WORLD WIDE PORT NAME | LOGICAL UNIT NUMBER | START BLOCK ADDRESS | END BLOCK ADDRESS |
| LD#01 | RG#01 | null | null | 0x0001 | 0x0100 |
| LD#02 | RG#02 | null | null | 0x0101 | 0x0200 |
| LD#03 | RG#02 | null | null | 0x0201 | 0x0300 |
| LD#04 | RG#03 | null | null | 0x0001 | 0x0500 |
| LD#15 | null | 50:00:00:01:1E:0A:E8:A1 | LU#01 | 0x0001 | 0x0250 |
| LD#16 | null | 50:00:00:01:1E:0A:E8:A2 | LU#02 | 0x0101 | 0x0400 |
| ... | ... | ... | ... | ... | ... |

FIG. 12

| MAC ADDRESS | WORLD WIDE PORT NAME | LOGICAL UNIT NUMBER | LOGICAL STORAGE AREA IDENTIFICATION INFORMATION |
|---|---|---|---|
| 00-80-C8-2D-82-01 | 50:00:00:01:1E:0A:F4:01 | LU#01 | LD#01 |
| 00-80-C8-2D-82-01 | 50:00:00:01:1E:0A:F4:01 | LU#02 | LD#02 |
| 00-80-C8-2D-82-02 | 50:00:00:01:1E:0A:F4:02 | LU#03 | LD#03 |
| 00-80-C8-2D-82-02 | 50:00:00:01:1E:0A:F4:02 | LU#04 | LD#04 |
| ... | ... | ... | ... |

FIG. 13

| MAC ADDRESS | WORLD WIDE PORT NAME | LOGICAL UNIT NUMBER | SERVER IDENTIFICATION INFORMATION | QUALITY OF SERVICE DEFINITION | |
|---|---|---|---|---|---|
| | | | | IOPS | MB/sec |
| 00-80-C8-2D-82-01 | 50:00:00:01:1E:0A:F4:01 | LU#01 | 50:10:01:E8:37:0B:51:01 | null | null |
| 00-80-C8-2D-82-01 | 50:00:00:01:1E:0A:F4:01 | LU#02 | 50:10:01:E8:37:0B:51:01 | null | null |
| | | | 50:10:01:E8:37:0B:51:02 | 1000 | null |
| 00-80-C8-2D-82-02 | 50:00:00:01:1E:0A:F4:02 | LU#03 | 50:10:01:E8:37:0B:51:01 | 2000 | 80 |
| 00-80-C8-2D-82-02 | 50:00:00:01:1E:0A:F4:02 | LU#04 | 50:10:01:E8:37:0B:51:01 | null | null |
| ... | ... | ... | ... | ... | ... |

| TIME | IO RATE [IO/sec] | DATA TRANSFER RATE [MB/sec] | PAUSE PERIOD [sec] | PAUSE COUNT |
|---|---|---|---|---|
| 01/01/2009  0:00 | 10 | 24 | 45 | 20 |
| 01/01/2009  0:15 | 1 | 2 | 0 | 0 |
| 01/01/2009  0:30 | 96 | 49 | 360 | 120 |
| ... | ... | ... | ... | ... |

| MOUNT POINT | TARGET WORLD WIDE PORT NAME | LOGICAL UNIT NUMBER |
|---|---|---|
| /mount/data1 | 50:00:00:01:1E:0A:F4:01 | LU#01 |
| /mount/data2 | 50:00:00:01:1E:0A:F4:01 | LU#02 |
| /mount/data3 | 50:00:00:01:1E:0A:F4:02 | LU#03 |
| /mount/data4 | 50:00:00:01:1E:0A:F4:02 | LU#04 |
| ... | ... | ... |

| RECEIVED WORLD WIDE PORT NAME | NUM OF DATA FRAME | AMOUNT OF DATA FRAME |
|---|---|---|
| 50:00:00:01:1E:0A:F4:00 | 30 | 400 |
| 50:00:00:01:1E:0A:F4:02 | 10 | 550 |
| ... | ... | ... |

| WORLD WIDE NODE NAME | WORLD WIDE PORT NAME | CONNECTED WORLD WIDE PORT NAME |
|---|---|---|
| 50:00:00:01:1E:0A:F4:00 | 50:00:00:01:1E:0A:F4:01 | 50:00:00:01:42:B1:28:04 |
| 50:00:00:01:1E:0A:F4:00 | 50:00:00:01:1E:0A:F4:02 | 50:00:00:01:42:B1:28:05 |
| 50:00:00:01:1E:0A:F4:00 | 50:00:00:01:1E:0A:F4:03 | 50:00:00:01:42:B1:29:03 |
| 50:00:00:01:1E:0A:F4:00 | 50:00:00:01:1E:0A:F4:04 | 50:00:00:01:1E:0A:F5:03 |
| ... | ... | ... |

FIG. 19

| QoS CONTROL TARGET IDENTIFICATION INFORMATION | CONFIGURATION CHANGE AVAILABILITY | PAUSE ALERT UPPER THRESHOLD [sec] | PAUSE ALERT LOWER THRESHOLD [sec] |
|---|---|---|---|
| 50:10:01:E8:37:0B:51:01 | TRUE | 300 | 60 |
| 50:10:01:E8:37:0B:51:02 | TRUE | 60 | 20 |
| 50:10:01:E8:37:0B:51:03 | FALSE | null | null |
| ... | ... | | ... |

STORAGE SYSTEM AND CONTROL METHOD THEREOF AS WELL AS PROGRAM

CROSS-REFERENCED TO RELATED APPLICATION

This application is a continuation of application Ser. No. 12/526,620, filed Aug. 10, 2009; which claims priority from PCT/JP2009/001713, filed Apr. 14, 2009, the contents of which are incorporated herein by reference.

TECHNICAL FIELD

The present invention relates to a storage system, and a control method thereof, as well as a program.

BACKGROUND OF THE INVENTION (1) Storage Area Network

A network which connects one or more computers and one or more external storage apparatuses is referred to as "storage area network (SAN)". It is a computer system which is often used particularly in the case where a plurality of computers cooperate with one another to provide one function, or in the case where one high-capacity storage apparatus is shared by one or more computers. Storage resources or computer resources can be easily added, deleted or replaced afterward, which provides an advantage of excellent scalability.

(2) Disk Array Apparatus

As the external storage apparatus connecting to the SAN, a disk array apparatus is generally often used. This disk array apparatus is an apparatus including many magnetic storage devices represented by a hard disk. Moreover, the same apparatus manages several magnetic storage devices as one set according to a RAID (Redundant Array of Independent Disks) technique. In addition, this set of the magnetic storage devices is referred to as "RAID group". The RAID group forms one or more logical storage areas. The computer connected to the SAN executes a data input and output process with respect to this storage area. When data is recorded in the same storage area, the disk array apparatus stores redundant data of one or two of the magnetic storage devices constituting the RAID group. Existence of this redundant data provides an advantage that even in a circumstance where one of the magnetic storage devices has failed, the data can be restored from remaining magnetic storage devices within the RAID group.

(3) Virtual Volume, Virtual Storage Technique

In operations of the SAN, various kinds of storage apparatuses which are different in manufacturer or class may be mixed. In such a circumstance, an operation manager has to perform management such as capacity allocation or volume allocation while caring about properties of the respective apparatuses, which imposes a significant burden. In order to address this problem, there is a virtual storage technique.

A storage virtualization apparatus virtualizes a storage capacity included in a storage apparatus which separately exists, as if it were a resource stored on the same virtualization apparatus, and provides it to a host computer. According to the same technique, management of resources on heterogeneous storage apparatuses with the different properties can be unified, which reduces the burden on the manager.

(4) FCOE (Fibre Channel Over Ethernet (Registered Trademark))

For the network constituting the SAN, Fibre Channel or iSCSI has been mainly used. Moreover, in addition to these communication methods, standardization of an FCOE technique has been newly advanced.

The FCOE is a communication method which has employed the Fibre Channel, instead of using TCP/IP, as a communication protocol, while using Ethernet (registered trademark) as a transmission infrastructure. Thereby, a merit can be obtained that it is possible to utilize assets of the Ethernet (registered trademark) while inheriting a conventional Fibre Channel operation, and in addition, it is possible to enable communication devices of the Fibre Channel and IP to be integrated with the Ethernet (registered trademark) which is the same communication infrastructure.

CITATION LIST

Patent Literature

PTL 1: JP Patent Publication (Kokai) No. 2005-011277A [0013]
PTL 2: JP Patent Publication (Kokai) No. 2005-359748A Non Patent Literature NPL 1: "Fibre Channel over Ethernet (registered trademark) in the Data Center", Fibre Channel Industry Association, 2007

SUMMARY OF THE INVENTION

Technical Problem

The conventional disk array apparatus (storage apparatus) as described above has used the Fibre Channel or the iSCSI as communication means for data input and output.

However, the conventional disk array apparatus is not FCOE-enabled. Consequently, in order to use the conventional disk array apparatus in an information system which tries to perform the data input and output by using the FCOE as the communication means, for example, it is necessary to provide a switch which converts between the FCOE and the Fibre Channel, in the SAN, and perform communications with respect to the disk array apparatus by using the conventional Fibre Channel as the communication protocol.

Consequently, as improvement measures, it is conceivable to include a communication interface for the FCOE in the disk array apparatus. However, for example, if a general-purpose FCOE interface installed in a server has been connected to the storage, technical problems caused by a mechanism of traffic control of the FCOE occur. One of the problems will be described below.

In other words, in a network connection apparatus (switch) constituting the FCOE, if output performance cannot catch up with an amount of input data, data waiting to be transferred is caused to temporarily remain in a buffer. If a state where an amount of data inputted to the buffer is larger than an amount of output data continues, the buffer is put into an overflow state, and thus the network connection apparatus sends a request message for temporarily stopping data transfer, to a transmitter. More specifically, PAUSE control which is a specification of the Ethernet (registered trademark) is executed.

On the other hand, in order for the disk array apparatus to enable the FCOE traffic control, this PAUSE process must be correctly executed.

Moreover, for executing a READ process, the disk array apparatus performs a data read-ahead process from a storage medium (mainly a magnetic disk drive) included therein to a cache memory so as to attempt acceleration. While the disk array apparatus temporarily stops the output due to the PAUSE control, if the read-ahead process is continued, read-ahead data is continuously loaded in the cache memory, which consumes a free memory capacity and may cause performance degradation.

In other words, when the disk array apparatus has received a PAUSE command, the disk array apparatus has to correctly interpret the command, and stop not only the data transfer to outside of the apparatus but also a process (for example, a process for reading into the buffer (cache)) within the apparatus.

The present invention has been made in view of such a circumstance, and provides a technique for enabling a storage system to enable the FCOE traffic control.

Solution to Problem

In order to solve the above described problems, in the present invention, when a disk array apparatus including a communication interface for the FCOE receives a transmission stop command sent from a network connection apparatus, the disk array apparatus controls a read-ahead process from a storage medium (cache memory), in accordance with a stop of transmission.

In other words, more specifically, a storage system according to the present invention is provided with a storage apparatus (100) having a storage area (130) for storing data, a management computer (400) which manages input and output of the data in the storage apparatus (100), and a network connection unit (300) which serves as an intermediary for a connection between the storage apparatus (100) and the management computer (400). Moreover, the storage apparatus (100) has a temporary storage area (140) for temporarily accumulating transfer data, and an FCOE-enabled I/O interface (110). In addition, the I/O interface (110) is connected to the network connection unit (300). In the storage system having such a configuration, the network connection unit (300) monitors an amount of data accumulated in a buffer memory (340) which temporarily accumulates the data transferred from the storage apparatus (100), and if the amount of the data accumulated in the buffer has become greater than or equal to a predetermined value, transmits a data transfer pause request to the storage apparatus (100). On the other hand, in response to the data transfer pause request, the storage apparatus (100) causes the data transfer to pause, and also, if an amount of the data transferred from the storage area (130) to the temporary storage area (140) has become a predetermined value, causes a data read-ahead process with respect to the temporary storage area (140) to pause.

More particularly, the storage apparatus (100) has a plurality of logical storage areas (180A to D), and a plurality of the FCOE-enabled I/O interfaces (110A1 to A4) associated with the plurality of logical storage areas (180A to D). In this case, the network connection unit (300) detects which I/O interface (110A1 to A4) of which logical storage area (180A to D) has a largest data transfer amount, and transmits the data transfer pause request to the storage apparatus (100). Then, in response to the transfer pause request, the storage apparatus (100) causes the data transfer from the I/O interface (110A1 to A4) indicating the largest data transfer amount to pause, and also causes the data read-ahead process from the logical storage area (180A to 180D) associated with the I/O interface (110A1 to A4) indicating the largest data transfer amount to pause, if an amount of the data in the temporary storage area (140) has become a predetermined amount.

Moreover, if the amount of the data accumulated in the buffer has become less than the predetermined value, the network connection unit (300) transmits a data transfer restart request to the storage apparatus (100). In response to this, the storage apparatus (100) restarts the data transfer.

Furthermore, the management computer (400) transmits a control signal for changing QoS (Quality of Service) of the storage apparatus (100) based on a length of a transfer pause period of the storage apparatus (100), to the storage apparatus (100). Then, in response to this control signal, the storage apparatus (100) may change the QoS of the apparatus itself.

Moreover, if the length of the transfer pause period of the storage apparatus (100) has exceeded a predetermined value, the management computer (400) transmits a control signal for changing a connection correspondence relationship between the logical storage area (180A to D) and the I/O interface (110A1 to A4), to the storage apparatus (100). Then, in response to this control signal, the storage apparatus (100) may change the connection relationship, and delete an original connection relationship before being changed. On this occasion, the management computer (400) may contain a GUI (Graphical User Interface) for presenting a change plan for the connection relationship and receiving an approval.

As another aspect, if the length of the transfer pause period of the storage apparatus (100) has exceeded the predetermined value, the management computer (400) transmits a control signal for changing a connection correspondence relationship between the above described logical storage area (180A to D) with the largest data transfer amount and the I/O interface (110A1 to A4), to the storage apparatus (100). Then, in response to the control signal, the storage apparatus (100) may change the connection relationship by storing a copy of the data in the logical storage area (180A to D) with the largest data transfer amount, in a new logical storage area, and connecting the new logical storage area in which the copy has been stored, to another I/O interface other than the I/O interface connected to the logical storage area (180A to D) with the largest data transfer amount.

Furthermore, another external storage apparatus (100A) other than the storage apparatus (100B) may be provided, and the storage apparatus (100B) may function as a virtualized volume of the external storage apparatus (100A). It should be noted that if the storage apparatus (100B) is virtualized, the management computer (400) transmits a setting instruction signal for setting the external storage apparatus (100A) and setting the storage apparatus (100B) to function as the virtualized volume of the external storage apparatus (100A), to the storage apparatus (100B). Then, in response to the setting instruction signal, the storage apparatus (100B) changes the setting and the connection relationship so that the storage apparatus (100B) functions as the virtualized volume of the external storage apparatus (100A).

Further characteristics of the present invention will become apparent in the following best mode for carrying out the invention and the accompanying drawings.

Advantageous Effects of Invention

According to the present invention, the storage system using an FCOE network as the communication means can be constructed. Moreover, since the FCOE traffic control is enabled on the disk array apparatus side, the performance degradation can be avoided.

BRIEF DESCRIPTION OF DRAWINGS

FIG. 10 is a diagram showing contents of RAID Group Configuration Information 1020.

FIG. 11 is a diagram showing contents of Storage Area Configuration Information 1030.

FIG. 12 is a diagram showing contents of Logical Storage Unit Configuration Information 1040.

FIG. 13 is a diagram showing contents of Server Communication Control Definition Information 1050.

FIG. 14 is a diagram showing contents of Operation Monitoring Information 1070.

FIG. 15 is a diagram showing contents of Storage Area Management Information 2030.

FIG. 17 is a diagram showing contents of Buffer Operation Monitoring Information 3010.

FIG. 18 is a diagram showing contents of Network Connection Configuration Information 4010.

FIG. 19 is a diagram showing contents of Storage Area Configuration Change Condition Definition Information 4070.

REFERENCE SIGNS LIST

Figure 1:
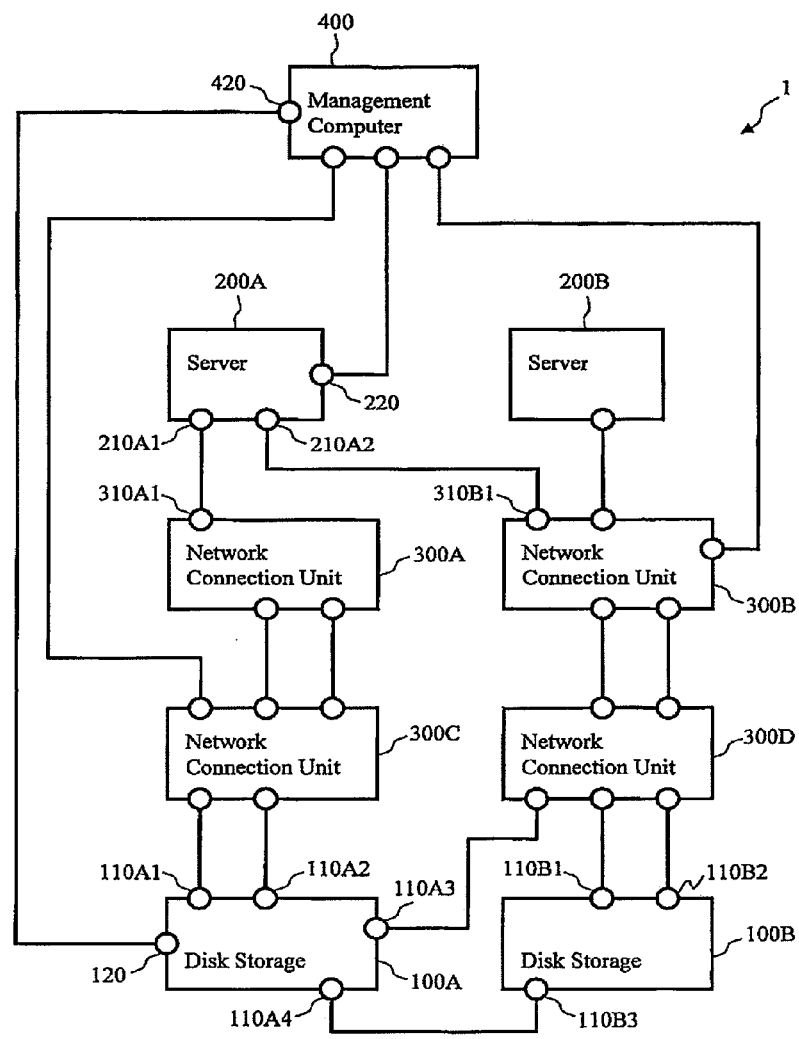
FIG. 1 is a diagram showing a schematic configuration of a storage system according to the present invention.

100: Disk Storage
200: Server
300: Network Connection Unit
400: Management Computer
110: Data I/O Network Interface
120: Management Network Interface
130: Disk Drive
140: Cache Memory
150: Network Processor Unit
160: Storage Controller
1000: Program Memory
210: Data I/O Network Interface
220: Management Network Interface
230: Disk Drive
240: Cache Memory
250: Network Processor Unit
260: Communication Bus
270: Processor Unit
2000: Program Memory
310: Data I/O Network Interface
320: Management Network Interface
340: Buffer Memory
350: Network Processor Unit
360: Communication Bus
420: Management Network Interface
430: Disk Drive
440: Cache Memory
460: Communication Bus
470: Processor Unit
480: Input Device
490: Output Device
4000: Program Memory
1010: Storage Area Configuration Management Program
1020: RAID Group Configuration Information
1030: Storage Area Configuration Information
1040: Logical Storage Unit Configuration Information
1050: Server Communication Control Definition Information
1060: Operation Monitoring Program
1070: Operation Monitoring Information
1080: Virtual Storage Control Program
1090: Connection Configuration Management Program
1110: Management Information Update Program
1120: Communication Performance Control Program
2010: Data Input/Output Program
2020: Storage Area Management Program
2030: Storage Area Management Information
2040: Connection Configuration Management Program
2050: Management Information Update Program
4010: Network Connection Configuration Information
4060: Management Information Update Program
4070: Storage Area Configuration Change Condition Definition Information
4080: Storage Area Configuration Calculation Program
4090: Storage Area Configuration Change Instruction Program
4100: Management Information Input/Output Program
10201: RAID GROUP IDENTIFICATION INFORMATION 10202: DISK DRIVE IDENTIFICATION INFORMATION
10301: LOGICAL STORAGE AREA IDENTIFICATION INFORMATION
10302: RAID GROUP IDENTIFICATION INFORMATION
10303: EXTERNAL STORAGE INFORMATION
10304: ADDRESS RANGE
10305: WORLD WIDE PORT NAME
10306: LOGICAL UNIT NUMBER (LUN)
10307: START BLOCK ADDRESS
10308: END BLOCK ADDRESS
10401: MAC ADDRESS
10402: WORLD WIDE PORT NAME
10403: LOGICAL UNIT NUMBER (LUN)
10404: LOGICAL STORAGE AREA IDENTIFICATION INFORMATION
10501: MAC ADDRESS
10502: WORLD WIDE PORT NAME
10503: LOGICAL UNIT NUMBER (LUN)
10504: SERVER IDENTIFICATION INFORMATION
10505: QUALITY OF SERVICE DEFINITION
10506: IOPS (IO per SECOND)
10507: MB/sec (Megabyte per sec)
10701: TIME
10702: IO RATE
10703: DATA TRANSFER RATE
10704: PAUSE PERIOD
10705: PAUSE COUNT
20301: MOUNT POINT
20302: TARGET WORLD WIDE PORT NAME
20303: LOGICAL UNIT NUMBER (LUN)
40101: WORLD WIDE NODE NAME
40102: WORLD WIDE PORT NAME
40103: CONNECTED WORLD WIDE PORT NAME
40701: QoS CONTROL TARGET IDENTIFICATION INFORMATION
40702: CONFIGURATION CHANGE AVAILABILITY
40703: PAUSE ALERT UPPER THRESHOLD
40704: PAUSE ALERT LOWER THRESHOLD
180: Logical Storage Area
280: Storage Area

BEST MODE FOR CARRYING OUT THE INVENTION

The present invention provides a technique for solving problems caused by a traffic control process of FCOE if an FCOE-enabled interface has been included in a storage apparatus. More specifically, the present invention discloses a technique for increasing and decreasing an amount of traffic data in order to avoid congestion in a network, and a technique for improving performance by changing a storage configuration.

Hereinafter, embodiments of the present invention will be described with reference to the accompanying drawings. However, it should be noted that these embodiments are merely an example for realizing the present invention, and do not limit the technical scope of the present invention. Moreover, configurations common in the respective figures have been given the same reference numerals.

(1) FIRST EMBODIMENT

<System Configuration>

FIG. 1 is a diagram schematically showing a physical connection configuration of a storage area network (storage system) according to the present invention.

The storage area network (storage system) is provided with one or more Disk Storages 100, one or more Servers 200, one or more Network Connection Units 300, and one or more Management Computers 400. In the storage area network, applications such as a database and a file server are operated, and the Server 200 inputs and outputs data with respect to a storage area of the Disk Storage 100, and provides information stored in the Disk Storage 100, to a client terminal (not shown). Moreover, the Disk Storage 100 includes a hard disk, and provides the storage area which is a unit of area in which the data is stored. The Disk Storage 100 and the Management Computer 400 are connected to each other directly and/or via the Network Connection Unit 300, and can input and output the data with respect to each other. Furthermore, the Server 200 and the Network Connection Unit 300 are also connected to the Management Computer 400, and can communicate with each other. It should be noted that, in a mode of the present embodiment, although a network for the data input and output is also used as a network for management, these networks may be independent, respectively.

Figure 20:
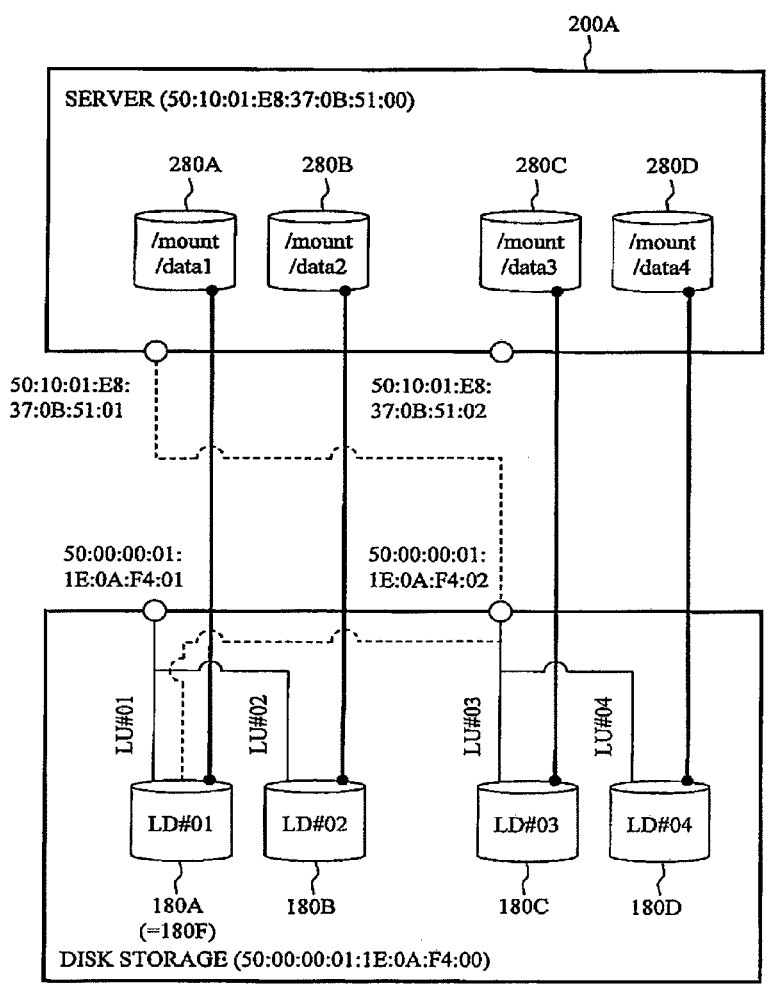
FIG. 20 is a diagram showing a storage system logical configuration.

Here, an example is shown in which a Server 200A executes the data input and output with respect to Data I/O Network Interfaces 110A1 and 110A2 included in a Disk Storage 100A, from a Data I/O Network Interface 210A1 to be described later, via the network. A storage area configuration will be described later (FIG. 20).

<Configuration of Disk Storage>

Figure 2:
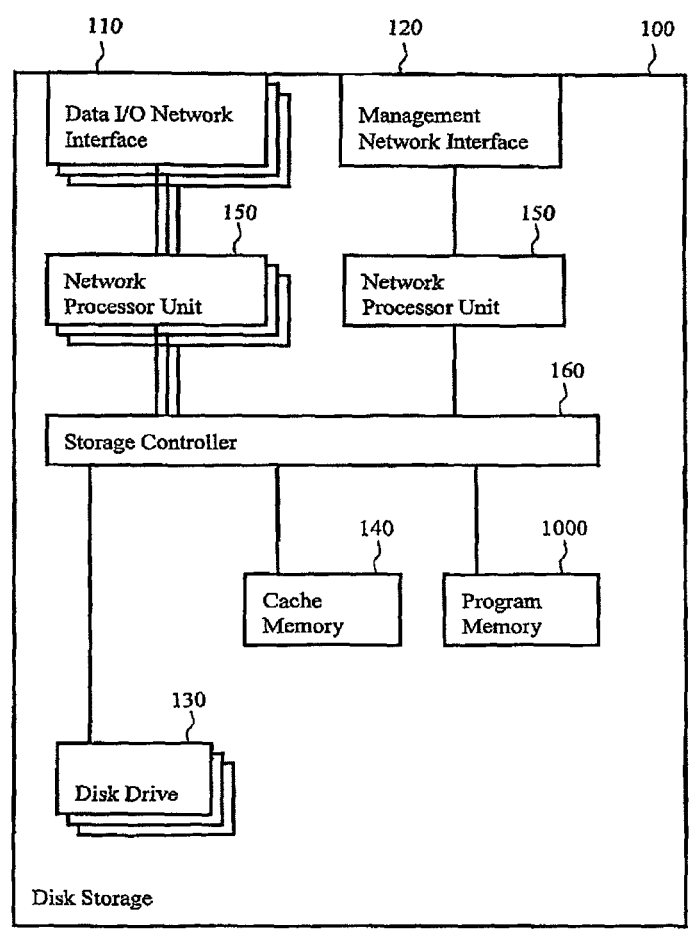
FIG. 2 is a diagram showing a schematic hardware configuration of a Disk Storage 100.

FIG. 2 is a diagram showing a schematic configuration (example) of the Disk Storage 100 according to the embodiment of the present invention. The Disk Storage 100 is provided with a Data I/O Network Interface 110 which is connected to the Network Connection Unit 300, for performing the data input and output, a Management Network Interface 120 for communicating with the Management Computer 400, a Network Processor Unit 150 which is a communication control apparatus for controlling data exchange via these, a Storage Controller 160 including a processor which takes charge of control within the Disk Storage 100, a Program Memory 1000 which is a storage space in which programs required for operations of the Disk Storage 100 are accumulated, a Cache Memory 140 which is a temporary storage area for accelerating the input and the output from the Server 200 to the storage area, and a Disk Drive 130 which is a magnetic storage apparatus for storing the data, which are configured to be connected to one another via the Storage Controller 160.

The Data I/O Network Interface 110 and the Management Network Interface 120 may be implemented with a network input and output apparatus in accordance with a conventional communication technique such as Fibre Channel or Ethernet (registered trademark). However, it is assumed that the Data I/O Network Interface 110 proposed by the present invention is implemented in accordance with the Ethernet (registered trademark) so as to be FCOE-enabled. It should be noted that, in the present invention, no limit is placed on the numbers of the Data I/O Network Interface 110 and the Management Network Interface 120. Moreover, the Data I/O Network Interface 110 and the Management Network Interface 120 may not be independent, and a form may be taken in which the Data I/O Network Interface 110 is also used for the purpose of inputting and outputting management information.

Although the Cache Memory 140 is generally implemented with a volatile memory, a nonvolatile memory or a magnetic storage apparatus may be substituted therefor. It should be noted that, in the present invention, no limit is placed on the number and a capacity of the Cache Memory 140.

Figure 6:
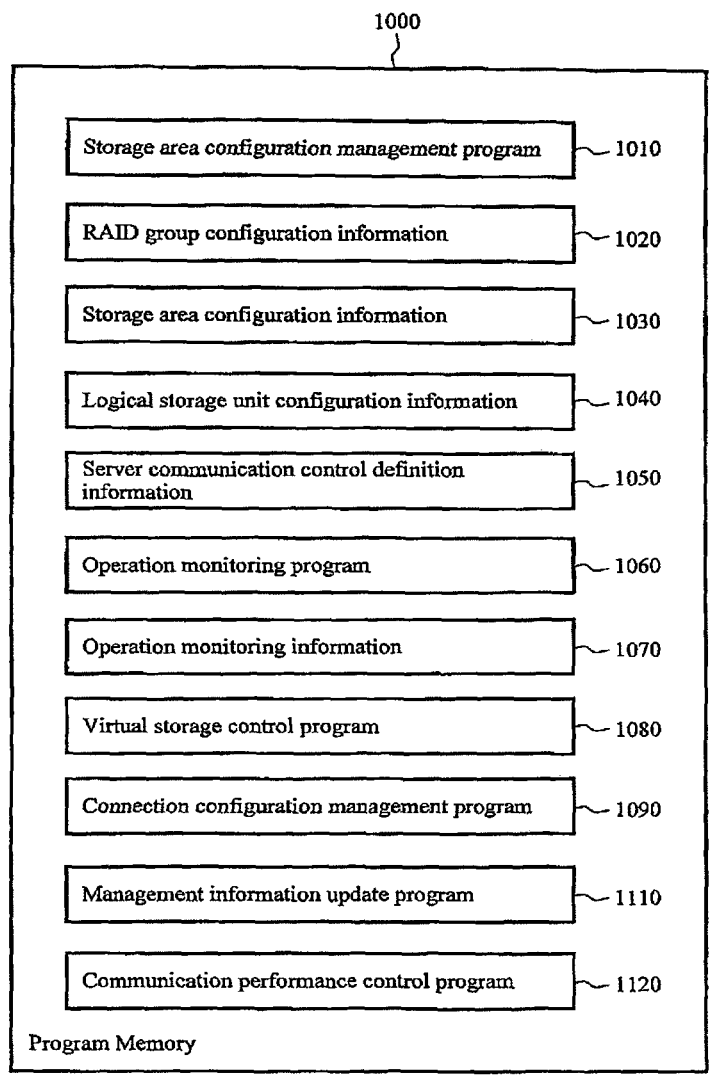
FIG. 6 is a diagram showing control information and programs stored in a Program Memory 1000 of the Disk Storage 100.

The Program Memory 1000 is a memory space implemented with a magnetic storage apparatus or a volatile semiconductor memory, and is used for the purpose of retaining basic programs and information required for the operations of the Disk Storage 100. Control programs and control information retained by the Program Memory 1000 will be described later (FIG. 6).

The Disk Drive 130 is a storage medium in which the data is stored, and may be implemented with a magnetic storage apparatus (hard disk drive: HDD) or a semiconductor memory drive (Solid State Disk: SSD). It should be noted that, in the present invention, no limit is placed on the number and a capacity of the Disk Drive 130.

The Network Processor Unit 150 executes a protocol process for controlling data transfer in units of packets or frames when the data input and output via the Network Interface is performed. Particularly, in the present invention, the Network Processor Unit 150 performs the protocol process or the traffic control of the FCOE.

<Configuration of Server>

Figure 3:
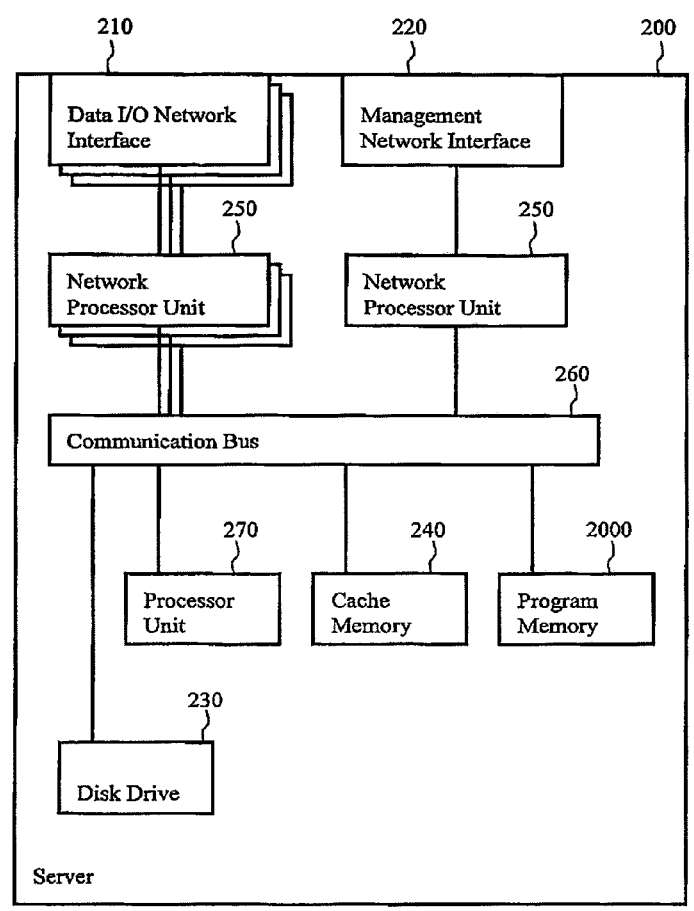
FIG. 3 is a diagram showing a schematic hardware configuration of a Server 200.

FIG. 3 is a diagram showing a schematic configuration (example) of the Server 200. The Server 200 is provided with a Data I/O Network Interface 210 for connecting to the Network Connection Unit 300 and performing the data input and output, a Management Network Interface 220 for communicating with the Management Computer 400, a Network Processor Unit 250 which is a communication control apparatus for controlling the data exchange via these, a Processor Unit 270 corresponding to a CPU which performs various calculation processes, a Disk Drive 230 which is a storage apparatus for saving basic software such as an operating system or the applications, a Program Memory 2000 which is a storage space in which programs required for operations of the Server 200 are accumulated, and a Cache Memory 240 which is a temporary storage area for accelerating the input and the output with respect to the storage apparatus, which are configured to be connected to one another via a Communication Bus 260. In other words, a hardware configuration of the Server 200 as shown in this example can be realized with a general-purpose computer (Personal Computer: PC).

The Network Interface, the Cache Memory 240, the Program Memory 2000, the Disk Drive 230 and the Network Processor Unit 250 may be implemented similarly to FIG. 2.

Figure 7:
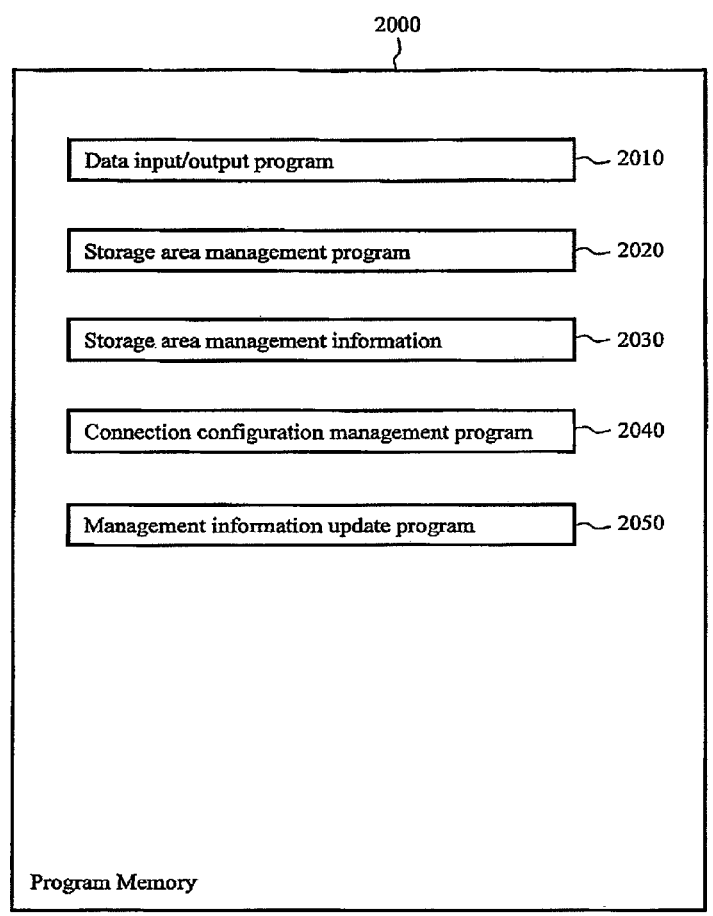
FIG. 7 is a diagram showing control information and programs stored in a Program Memory 2000 of the Server 200.

The Program Memory 2000 may be used for operating a business application program for generating and updating information to be stored in the Disk Storage 100, for example, a database, an accounting program or the like. Control programs and control information retained by the Program Memory 2000 will be described later (FIG. 7).

<Configuration of Network Connection Unit>

Figure 4:
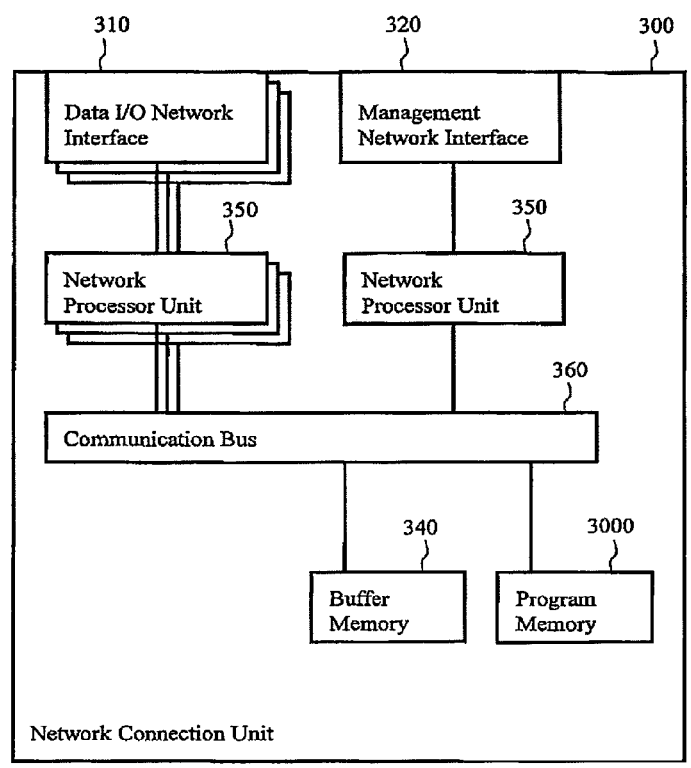
FIG. 4 is a diagram showing a schematic hardware configuration of a Network Connection Unit 300.

FIG. 4 is a diagram showing a schematic configuration (example) of the Network Connection Unit 300. The Network Connection Unit 300 is provided with a Data I/O Network Interface 310 for connecting to an external apparatus and performing the data input and output, a Management Network Interface 320 for communicating with the Management Computer 400, a Network Processor Unit 350 which is a communication control apparatus for controlling the data exchange via these, a Buffer Memory 340 for temporarily retaining the data to be transferred, and a Program Memory 3000 which is a storage space in which programs required for operations of the Network Connection Unit 300 are accumulated, which are configured to be connected to one another via a Communication Bus 360. It should be noted that the Network Interface and the Network Processor Unit 350 may be implemented similarly to FIG. 2.

<Configuration of Management Computer>

Figure 5:
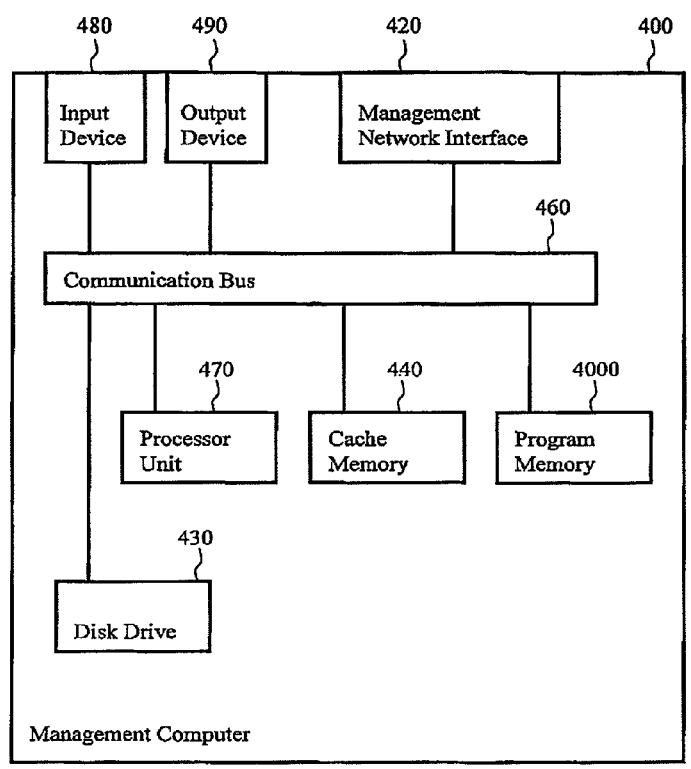
FIG. 5 is a diagram showing a schematic hardware configuration of a Management Computer 400.

FIG. 5 is a diagram showing a schematic configuration (example) of the Management Computer 400. The Management Computer 400 is provided with a Management Network Interface 420 for connecting to the external apparatus and inputting and outputting the management information, an Input Device 480 for inputting the information by an operator, for example, such as a keyboard or a mouse, an Output Device 490 for outputting the information to the operator, for example, such as a general-purpose display, a Processor Unit 470 corresponding to the CPU which performs the various calculation processes, a Disk Drive 430 which is a storage apparatus for saving the basic software such as the operating system or the applications, and a Program Memory 4000 which is a storage space in which programs required for operations of the Management Computer 400 are accumulated, which are configured to be connected to one another via a Communication Bus 460. In other words, a hardware configuration of the Management Computer 400 as shown in this example can be realized with the general-purpose computer (Personal Computer: PC).

Figure 9:
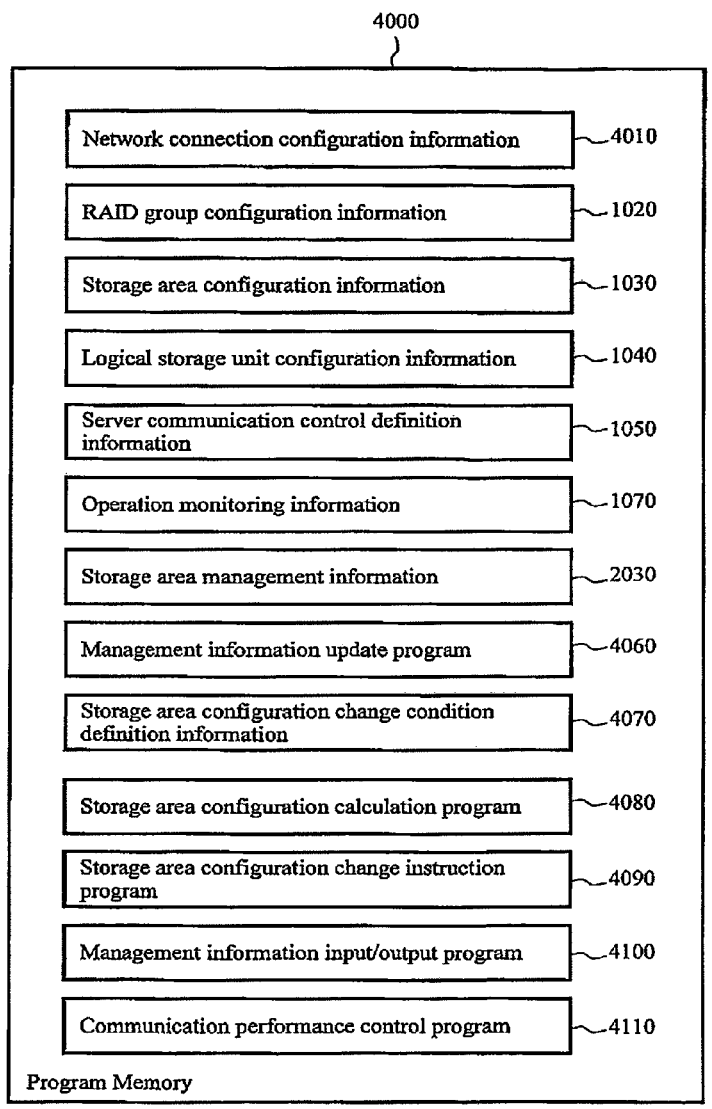
FIG. 9 is a diagram showing control information and programs stored in a Program Memory 4000 of the Management Computer 400.

The Program Memory 4000 is a memory space implemented with a magnetic storage apparatus or a volatile semiconductor memory, and is used for the purpose of retaining basic programs and information required for the operations of the Management Computer 400. Control programs as well as control information retained by the Program Memory 4000 will be described later (FIG. 9).

<Control Programs and Control Information in Disk Storage>

FIG. 6 is a diagram showing one configuration example of the control programs as well as the control information included in the Program Memory 1000 by the Disk Storage 100. It should be noted that each program operates as each processing unit in cooperation with the Network Processor Unit 150. For example, a Storage Area Configuration Management Program 1010 becomes a storage area configuration management (processing) unit. The same applies to other programs.

The Storage Area Configuration Management Program 1010 is a program for managing storage resources provided to the Server 200 by the Disk Storage 100 based on configuration information to be described later. RAID Group Configuration Information 1020 represents a configuration of a RAID group consisting of a set of the Disk Drives 130. Storage Area Configuration Information 1030 represents a configuration of a storage area which is obtained by logically dividing the RAID group and is a unit of the storage resources. Logical Storage Unit Configuration Information 1040 represents a configuration of a logical storage unit which is a unit of the storage resources provided to the Server 200.

Server Communication Control Definition Information 1050 is information in which communication quality (QoS) for each server connecting to the logical storage unit has been defined.

An Operation Monitoring Program 1060 is a program which records operation loads such as the number of I/O processes, a data transfer amount, and a transfer process stop period, for each storage area or each Data I/O Network Interface 110. Operation Monitoring Information 1070 represents records of actual operation results such as the number of I/O processes, the data transfer amount, and the transfer process stop period, for each storage area or each Data I/O Network Interface 110.

A Virtual Storage Control Program 1080 is a program for referring to a logical storage unit provided by a second Disk Storage 100 to which a first Disk Storage 100 has been connected, and handling the logical storage unit as if it were a storage area retained by the first Disk Storage 100.

A Connection Configuration Management Program 1090 is a program for identifying the external apparatus which is a connection destination of the Data I/O Network Interface 110.

A Management Information Update Program 1110 is a program which controls communications for outputting the configuration information as well as the operation monitoring information contained in the Disk Storage 100 to the Management Computer 400.

A Communication Performance Control Program 1120 is a program which controls communication performance according to the Server Communication Control Definition Information 1050, by placing an upper limit on input and output process performance for each server, or the like.

<Control Programs and Control Information in Server>

FIG. 7 is one configuration example of the control programs as well as the control information stored in the Program Memory 2000 by the Server 200. Each program operates as each processing unit in cooperation with the Network Processor Unit 250. For example, a Data Input/Output Program 2010 becomes a data input/output processing unit. The same applies to other programs.

The Data Input/Output Program 2010 is a program which performs a read/write process with respect to the logical storage unit provided by the Disk Storage 100.

A Storage Area Management Program 2020 is a program for operating the storage area of the Disk Storage 100 by the Server 200 based on Storage Area Management Information 2030 to be described later.

Storage Area Management Information 2030 represents configuration information for associating the logical storage unit provided by the Disk Storage 100 with a file system operated by the Server 200.

A Connection Configuration Management Program 2040 is a program for identifying the external apparatus which is the connection destination of the Data I/O Network Interface 210.

A Management Information Update Program 2050 is a program which controls the communications for outputting the configuration information as well as the operation monitoring information contained in the Disk Storage 100 to the Management Computer 400.

<Control Programs and Control Information in Network Connection Unit>

Figure 8:
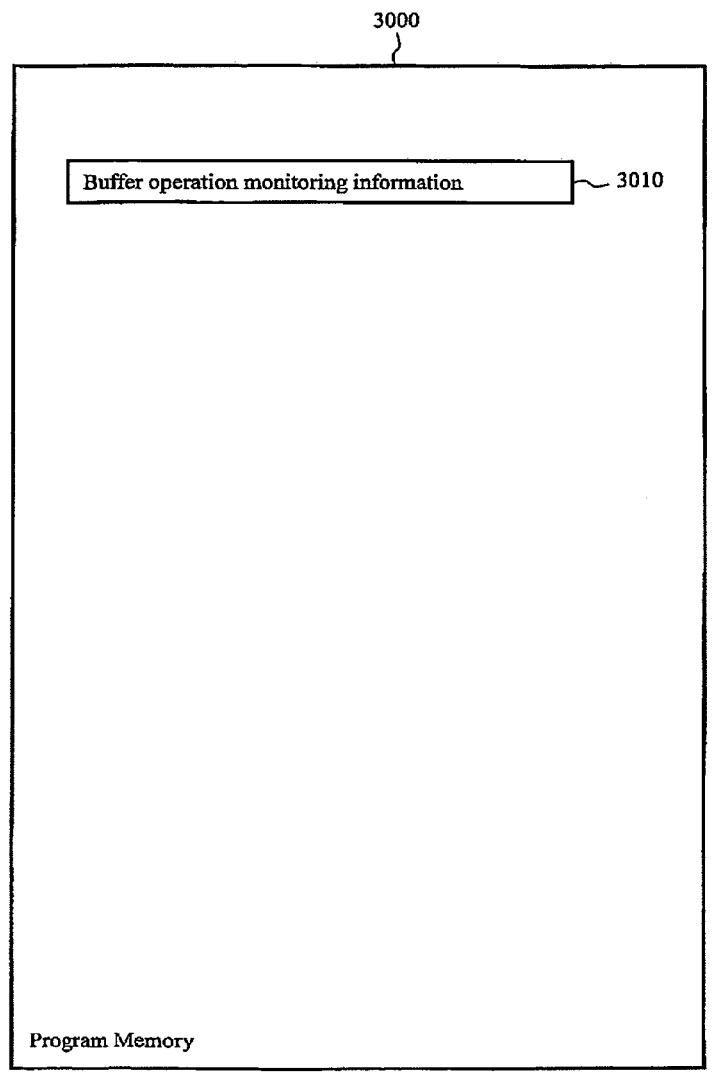
FIG. 8 is a diagram showing control information stored in a Program Memory 3000 of the Network Connection Unit 300.

FIG. 8 is a diagram showing one configuration example of the control information stored in the Program Memory 3000 by the Network Connection Unit 300.

Buffer Operation Monitoring Information 3010 is information in which a usage status of the data stored in the Buffer Memory 340 has been totaled.

<Control Programs and Control Information in Management Computer>

FIG. 9 is one configuration example of the control programs as well as the control information stored in the Program Memory 4000 by the Management Computer 400. Each program operates as each processing unit in cooperation with the Network Processor Unit 250. For example, a Management Information Update Program 4060 becomes a management information update processing unit. The same applies to other programs.

Network Connection Configuration Information 4010 represents physical connection configuration (network topology) information on the Server 200, the Disk Storage 100 and the Network Connection Unit 300.

The RAID Group Configuration Information 1020, the Storage Area Configuration Information 1030, the Logical Storage Unit Configuration Information 1040, the Server Communication Control Definition Information 1050, and the Operation Monitoring Information 1070 correspond to the same information obtained from the Disk Storage 100. The Storage Area Management Information 2030 corresponds to the same information obtained from the Server 200.

The Management Information Update Program 4060 is a program which communicates with the Disk Storage 100, the server 200 and the Network Connection Unit 300 to obtain the configuration information.

Storage Area Configuration Change Condition Definition Information 4070 is information in which a condition used for determining whether or not to change the storage area configuration of the Disk Storage 100 in order to realize proper loads in the network has been defined.

A Storage Area Configuration Calculation Program 4080 is a program which obtains a new storage area configuration which realizes the proper loads, by calculations. A Storage Area Configuration Change Instruction Program 4090 is a program which instructs the Disk Storage 100 and the Server 200 to perform the configuration change, according to a calculation result in the above described Storage Area Configuration Calculation Program 4080. A Management Information Input/Output Program 4100 is a program which provides an interface for inputting and outputting the management information by using the Input Device 480 and the Output Device 490 by a manager of the Management Computer 400.

A Communication Performance Control Program 4110 is a program for executing a process for upgrading or downgrading the QoS in the Disk Storage 100.

<Configuration of Each Piece of Control Information in Disk Storage>

FIG. 10 is a diagram showing one configuration example of the RAID Group Configuration Information 1020 included in the Disk Storage 100. The RAID group recorded in RAID GROUP IDENTIFICATION INFORMATION 10201 is composed of a set of a plurality of the Disk Drives 130 recorded in DISK DRIVE IDENTIFICATION INFORMATION 10202. The Disk Drive 130 constituting the RAID group is a unit for constituting a RAID (Redundant Array of Independent Disks).

FIG. 11 is a diagram showing one configuration example of the Storage Area Configuration Information 1030 included in the Disk Storage 100. The storage area recorded in LOGICAL STORAGE AREA IDENTIFICATION INFORMATION 10301 represents information for identifying a logical storage area defined in the RAID group recorded in RAID GROUP IDENTIFICATION INFORMATION 10302.

If the same storage area is a virtual storage area, EXTERNAL STORAGE INFORMATION 10303 represents information on the logical storage unit provided by the second (external) Disk Drive 100 corresponding to the same storage area. "null" indicates that there is no associated storage area in an external Storage and there is the storage area within the Storage itself.

An ADDRESS RANGE 10304 represents a logical address space of a range corresponding to the above described logical storage area, in the same RAID group or external logical storage unit. In other words, the logical storage area is operated in two ways, in the case of a part of the RAID group stored in the above described Disk Storage 100, and in the case of the logical storage unit provided by the second Disk Storage 100. In the latter case, the logical storage unit identified by a LOGICAL UNIT NUMBER 10306, which has been defined for a Data I/O Network Interface 110 identified by a WORLD WIDE PORT NAME 10305 in the second Disk Storage 100, corresponds to the above described logical storage area.

FIG. 12 is a diagram showing one configuration example of the Logical Storage Unit Configuration Information 1040 included in the Disk Storage 100. In the Disk Storage 100 of the present invention, in order to enable communications in accordance with the Fibre Channel over Ethernet (registered trademark), it is assumed that identification information on its Data I/O Network Interface 110 can be represented by a MAC ADDRESS 10401 as well as a WORLD WIDE PORT NAME 10402.

The logical storage unit is identified by a LOGICAL UNIT NUMBER 10403 defined for each this Data I/O Network Interface 110. Furthermore, a storage area constituting the same logical storage unit is represented by LOGICAL STORAGE AREA IDENTIFICATION INFORMATION 10404. In other words, an I/O request is issued to the LOGICAL UNIT NUMBER 10403, and is actually associated with the storage area represented by the LOGICAL STORAGE AREA IDENTIFICATION INFORMATION 10404.

FIG. 13 is a diagram showing one configuration example of the Server Communication Control Definition Information 1050 included in the Disk Storage 100. The logical storage unit provided by the Disk Storage 100 is identified by a MAC ADDRESS 10501, a WORLD WIDE PORT NAME 10502 and a LOGICAL UNIT NUMBER 10503, as described in FIG. 12. Furthermore, it is assumed that identification information on the SERVER 200 which refers to the same logical storage unit and to which the same logical storage unit can be connected is represented by SERVER IDENTIFICATION INFORMATION 10504.

In the SERVER IDENTIFICATION INFORMATION 10504, the SERVER 200 which can use an LU specified by the LOGICAL UNIT NUMBER 10503 has been defined. In this field, for example, a WWNN representing the SERVER 200 or the WWPN of the Data I/O Network Interface 210 included in the same SERVER 200 is described. If the I/O request has arrived from a SERVER which is not described here, the I/O request is rejected.

A QUALITY OF SERVICE DEFINITION 10505 represents input and output performance defined for each piece of the same SERVER IDENTIFICATION INFORMATION 10504, in IOPS 10506 or in MB/sec 10507. The IOPS 10506 represents the number of JO processes, and the MB/sec 10507 represents the data transfer amount. The Quality of Service (QoS) defined here represents a minimum reserved resource which is exclusively available (that is, a value of performance desired to be guaranteed when the SEVER 200 has accessed) in each logical storage unit. Moreover, in order not to influence other LUs, the Quality of Service (QoS) may be highest process performance (the upper limit of the process performance). It should be noted that if the QUALITY OF SERVICE DEFINITION 10505 is "null", it represents that the QoS is undefined. In this case, the control is performed in a best-effort manner.

FIG. 14 is a diagram showing one configuration example of the Operation Monitoring Information 1070 recorded in the Disk Storage 100. A TIME 10701 represents an operation status observation time. It should be noted that operation load information to be described later may be an instantaneous value at the same observation time, or may be an average value or a maximum value in a sampling interval (in this example, 15 minutes). An IO RATE 10702 represents, for example, an observed value of the number of IO processes per second. A DATA TRANSFER RATE 10703 represents, for example, an observed value of a data transfer time per second. A PAUSE PERIOD 10704 represents a sum of periods when an input and output process has been stopped in the same sampling period. A PAUSE COUNT 10705 represents the number of PAUSE control commands received by the same Data I/O Network Interface 110 in the same sampling interval.

<Configuration of Control Information in Server>

FIG. 15 is one configuration example of the Storage Area Management Information 2030 managed by the Server 200. A MOUNT POINT 20301 represents a mount point corresponding to a logical position with which the logical storage unit is associated on the file system operated by the Server 200. A TARGET WORLD WIDE PORT NAME 20302 represents the identification information on the Data I/O Network Interface 110 on the Disk Storage 100 of the logical storage unit associated with the same mount point. A LOGICAL UNIT NUMBER 20303 represents an identification number of the logical storage unit defined for the same Data I/O Network Interface 110. Therefore, when the Server 200 reads or writes the data with respect to the MOUNT POINT 20301, the data is read or written with respect to the LU of a corresponding LOGICAL UNIT NUMBER 20303.

<Configuration of Control Information in Network Connection Unit>

Figure 16:
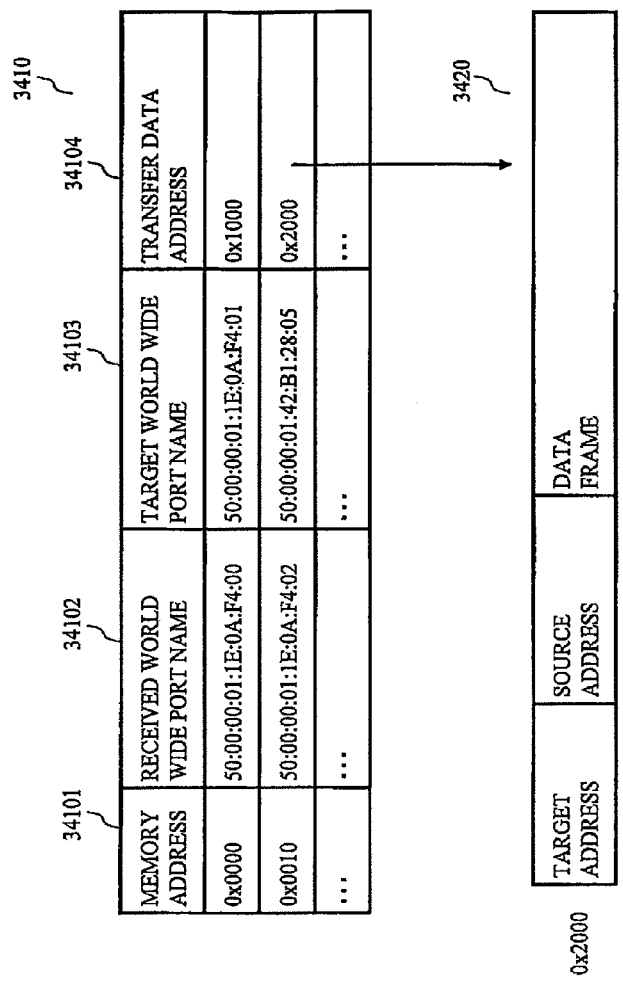
FIG. 16 is a diagram showing a structure of data stored in a Buffer Memory 340 of the Network Connection Unit 300.

FIG. 16 is a diagram showing a data structure example of the data stored in the Buffer Memory 340 by the Network Connection Unit 300. The Buffer Memory 340 constitutes a physical or virtual address space.

A MEMORY ADDRESS 34101 indicates one address position within the Buffer Memory 340. A RECEIVED WORLD WIDE PORT NAME 34102 indicates the Data I/O Network Interface 310 which has received transfer data stored in the MEMORY ADDRESS 34101. A TARGET WORLD WIDE PORT NAME 34103 indicates the Data I/O Network Interface 310 which transmits the transfer data stored in the MEMORY ADDRESS 34101. A TRANSFER DATA ADDRESS 34104 indicates an address position in which the transfer data has been stored. The transfer data stored in the same address may have such a structure containing a TARGET ADDRESS (transmission destination address), a SOURCE ADDRESS (transmitter address), and a DATA FRAME (contents of the transfer data).

FIG. 17 is a diagram showing one configuration example of the Buffer Operation Monitoring Information 3010 stored in the Program Memory 3000. In the Buffer Operation Monitoring Information 3010, the usage status of the data stored in the buffer described in FIG. 16 has been totaled.

A RECEIVED WORLD WIDE PORT NAME 30101 is the Data I/O Network Interface 310 included in the Network Connection Unit 300. A NUM OF DATA FRAME 30102 represents the number of frames of buffer data received at the I/F identified by the RECEIVED WORLD WIDE PORT NAME 30101, that is, a sum value of the TRANSFER DATA ADDRESS 34104. An AMOUNT OF DATA FRAME 30103 represents a total data amount of the buffer data received at the I/F identified by the RECEIVED WORLD WIDE PORT NAME 30101.

<Configuration of Control Information in Management Computer>

FIG. 18 is a diagram showing a configuration example of the Network Connection Configuration Information 4010 generated based on the connection configuration information which has been collected from each management target apparatus by the Management Computer 400.

A WORLD WIDE NODE NAME 40101 represents information for uniquely identifying the management target apparatus (for example, the Network Connection Unit). A WORLD WIDE PORT NAME 40102 represents a communication interface (an address of one port among several ports) included in the apparatus identified by the WORLD WIDE NODE NAME 40101. A CONNECTED WORLD WIDE PORT NAME 40103 represents information for uniquely identifying the communication interface (one port address among several ports) of an apparatus of the other party connected to the WORLD WIDE PORT NAME 40102. All connections are managed based on this Network Connection Configuration Information 4010. For example, in order to manage a port of another apparatus connected to a port of an apparatus with 40103 of "50:00:00:01:1E:0A:F5:03", a name of the apparatus with "50:00:00:01:1E:0A:F5:03" is described in 40101, port addresses contained in the apparatus are described in 40102, and ports of other apparatuses connected thereto respectively are described in 40103.

FIG. 19 is a diagram showing one configuration example of the Storage Area Configuration Change Condition Definition Information 4070 managed by the Management Computer 400.

QoS CONTROL TARGET IDENTIFICATION INFORMATION 40701 is, for example, the Data I/O Network Interface 110, the logical storage unit or the logical storage area, and a control target for the communication quality or the input and output performance may be described. CONFIGURATION CHANGE AVAILABILITY 40702 represents whether or not a configuration of the control target described in the QoS CONTROL TARGET IDENTIFICATION INFORMATION 40701 can be changed, with a true/false value. A PAUSE ALERT UPPER THRESHOLD 40703 as well as a PAUSE ALERT LOWER THRESHOLD 40704 define a condition used for determining whether or not to change the Quality of Service (QoS), with an upper threshold as well as a lower threshold.

<Logical System Configuration>

FIG. 20 is a diagram logically representing a system configuration example by using the above described configuration information.

It is assumed that the SERVER 200A identified by the WORLD WIDE NODE NAME of "50:10:01:E8:37:0 B:51:00" has been connected to the Disk Storage 100 identified by the WORLD WIDE NODE NAME of "500860:01:1 E:0A:F4:00", via the network. It should be noted that the Network Connection Unit 300 which connects these is not described in this figure for convenience.

It is assumed that the Server 200A has four Storage Areas 280, each of which has been associated with the file system at each mount point. Among these, a Storage Area 280A mounted at "/mount/data1" corresponds to a logical storage unit "LU#01" defined for the Data I/O Network Interface 110 identified by "500870:01:1 E:0A:F4:01" of the Disk Storage 100. This Logical Storage Unit 180A is composed of a logical storage area "LD#01". It is assumed that others have also been similarly associated with Logical Storage Units 180B, 180C and 180D.

<Traffic Control Process in Network Connection Unit>

Figure 21:
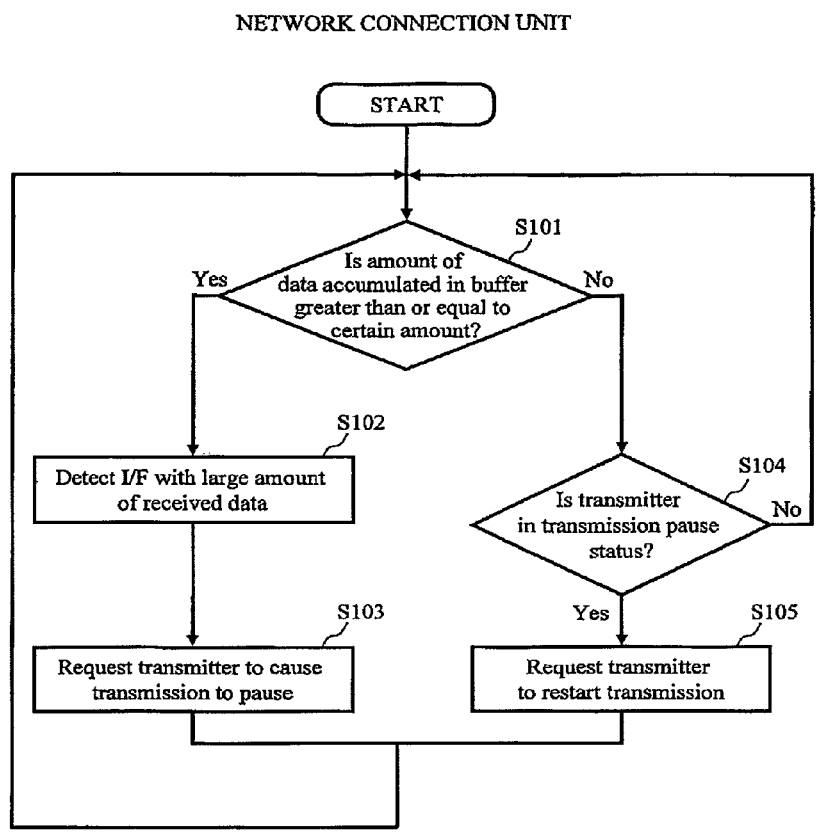
FIG. 21 is a flowchart for illustrating a transmission stop control instruction process.

FIG. 21 is a flowchart for illustrating a part of a traffic control process procedure according to a specification of the FCOE.

For example, in such a circumstance where output performance from one Data I/O Network Interface 310 is poor for an amount of incoming data, the Network Connection Unit 300 temporarily accumulates the transfer data in the Buffer Memory 340. A Network Processor Unit 350A which controls the Data I/O Network Interface 310 which processes the incoming data determines whether or not this remaining data has reached greater than or equal to a certain amount (step S101). If a result of the same determination is Yes, the Network Processor Unit 350A refers to the Buffer Operation Monitoring Information 3010, and detects the Data I/O Network Interface 310 with a largest NUM OF DATA FRAME 30102 or a largest AMOUNT OF DATA FRAME (step S102). Then, the Network Processor Unit 350A transmits a PAUSE control command for instructing to cause the transmission to pause, to a connection apparatus of the other party connected to the same Data I/O Network Interface 310 (step S103). For example, the pause of the transmission for a certain period may be instructed by previously describing a stop period parameter such as 1 msec, 1 sec or 10 sec in the same transmitted message.

On the other hand, if the result of the determination in step S101 is "No", the Network Processor Unit 350A determines whether or not the connection destination is in a transmission pause state due to the PAUSE control command which has been previously transmitted (step S104). If a result of the same determination is "Yes", the Network Processor Unit 350A instructs the communication interface of a transmitter to restart the data transfer (step S105). For example, in this PAUSE control command, the stop period parameter of 0 msec may be recorded. If the result of the determination in step S104 is "No", the process proceeds to step S101.

<Process in Disk Storage which has Received Transmission Pause Request>

Figure 22:
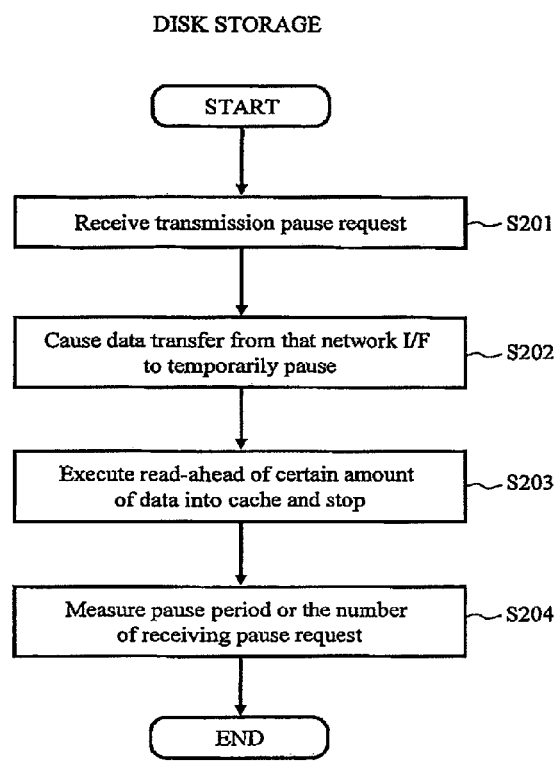
FIG. 22 is a flowchart for illustrating a transmission stop control process.

FIG. 22 is a flowchart for illustrating a process in the Disk Storage 100 which has received a transmission pause request from the NETWORK CONNECTION UNIT 300 in step S103 of FIG. 21 (operations of the Communication Performance Control Program 1120).

If the Data I/O Network Interface 310A in charge of sending out data included in a NETWORK CONNECTION UNIT 300A becomes a bottleneck, the Network Processor Unit 350A transmits the PAUSE control command to the connection apparatus of the data transmitter connected to a Data I/O Network Interface 310B in charge of incoming of the data (step S103). In a Network Connection Unit 300B of the connection destination which has received this, in order to temporarily stop a data transfer process, the data amount is similarly accumulated in the buffer, and furthermore, the PAUSE control is transmitted to an upstream data transmitter apparatus. In this way, in a chain-reaction manner, the PAUSE control command is sent to the Data I/O Network Interface 110 included in the Disk Storage 100 which is a data sender apparatus (step S201).

The Network Processor Unit 150 which controls the Data I/O Network Interface 110 in the Disk Storage 100 which has received this PAUSE control command causes the data transmission from the above described Data I/O Network Interface 110 to temporarily pause (step S202). At this time, if the destination address has been designated in the PAUSE control command received in step 5201, only the data transmission to the same destination may be caused to pause so that influences on other processes may be avoided.

Furthermore, the Storage Controller 160 may be executing a read-ahead process in which data to be transferred in the future is read ahead from the Disk Drive 130 and previously saved in the Cache Memory 140 in order to improve performance of the Disk Storage 100. In this case, even though the sending out of the data has been caused to pause, if the read-ahead is continuously executed, the read-ahead data may be accumulated in the Cache Memory 140 and may consume a memory capacity. Consequently, if an amount of the read-ahead data has reached a certain amount, the Storage Controller 160 causes the read-ahead process to temporarily pause (step S203). Also during the pause of the transmission, the Storage Controller 160 counts the pause period or the number of receiving the PAUSE control command, and updates the Operation Monitoring Information 1070 (FIG. 14) (step S204).

Although the Disk Storage 100 has a plurality of the Data I/O Network Interfaces, as shown in FIG. 20, the logical storage area (LU) has been associated with each of these Data I/O Network Interfaces (each connection relationship has been managed). Therefore, the above described transfer pause process and the process of the temporary pause of the read-ahead are executed based on the relationship between the Data I/O Network Interface and the logical storage area connected thereto.

It should be noted that when a PAUSE command is received, the data transfer is caused to pause for a predetermined period for each one command. Then, when the above described predetermined period has elapsed, the data transfer is automatically restarted. Hence, the processes of FIGS. 21 and 22 constantly operate, and the transmission and the reception of the PAUSE command, and the pause of the data transfer are repeated as appropriate.

<Process in Disk Storage which has Received Transmission Restart Request>

Figure 23:
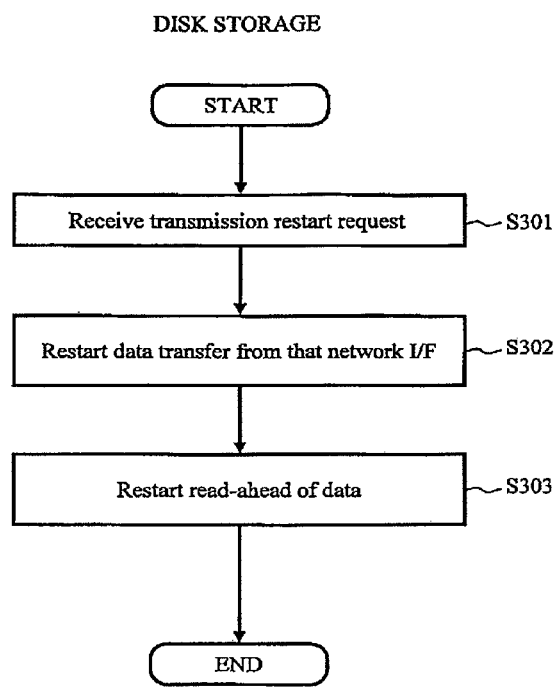
FIG. 23 is a flowchart for illustrating a transmission start control process.

FIG. 23 is a flowchart for illustrating a process in the Disk Storage 100 which has received a transmission restart request from the NETWORK CONNECTION UNIT 300 in step S105 of FIG. 21.

If the Data I/O Network Interface 110 included in the Disk Storage 100 receives a transmission restart request command (step S301), the Network Processor Unit 150 which controls the same Data I/O Network Interface 110 restarts the sending out of the data from the same Data I/O Network Interface 110 (step S302). Furthermore, the Storage Controller 160 restarts the data read-ahead process which has been in a pause state in step 5203 (step S303).

It should be noted that, on the premise of the above described operations in which when the PAUSE command is received, the pause is performed for the predetermined period, and when the predetermined period has expired, the data transfer is automatically restarted (see a description of FIG. 22), this process is executed if an amount of the data accumulated in the buffer has become less than a certain amount before the predetermined pause period due to the PAUSE command expires.

According to the above described configurations and process operations, the Disk Storage 100 can control the sending out of the data in response to the PAUSE control of the FCOE. Furthermore, an effect that performance degradation within the storage is avoided can be obtained by linking the read-ahead process to the PAUSE control.

<Update Process for Various Pieces of Management Information in Management Computer>

Figure 24:
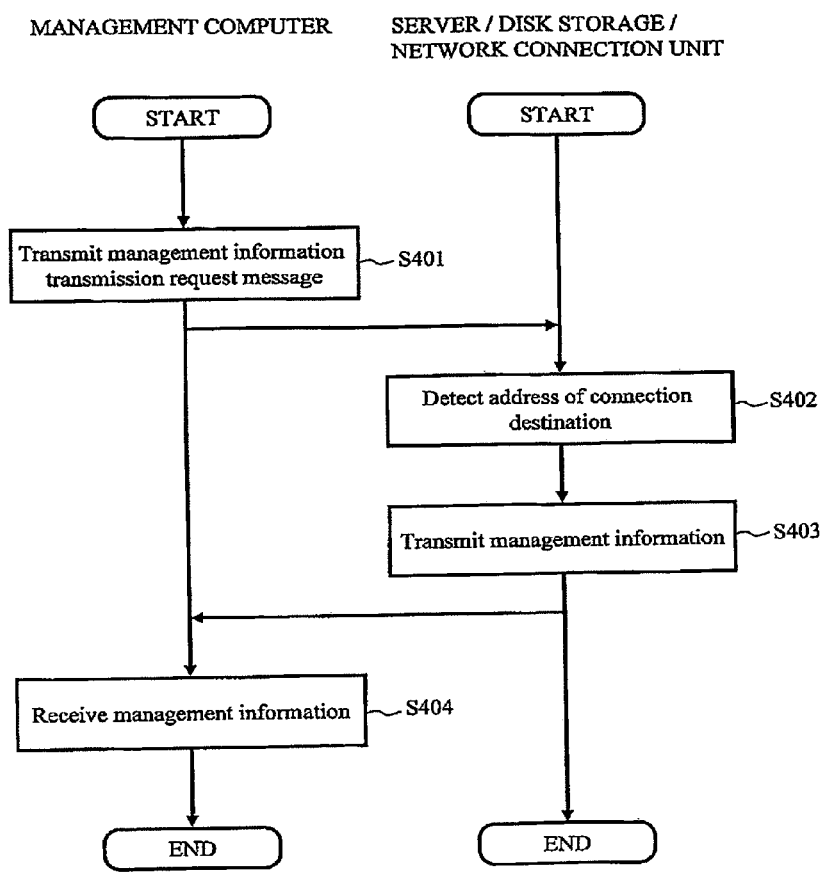
FIG. 24 is a flowchart for illustrating a management information update process.

FIG. 24 is a flowchart for illustrating a process for updating various pieces of the management information retained by the Management Computer 400 (operations of the Management Information Update Program 4060).

The Management Computer 400 periodically repeats the above described process by using the Management Information Update Program 4060, and keeps the various pieces of the management information up to date.

The Processor Unit 470 sends a management information transmission request message to the Disk Storage 100, the Server 200 and the Network Connection Unit 300 (step S401). The apparatuses which have received this first detect addresses of connection destination Network Interfaces connected to the Data I/O Network Interfaces 110, 210 and 310 included therein, respectively (step S402). Along with this detected connection destination information, the RAID Group Configuration Information 1020, the Storage Area Configuration Information 1030, the Logical Storage Unit Configuration Information 1040, the Operation Monitoring Information 1070, and the Storage Area Management Information 2030 are returned (step S403). In the Management Computer 400 which has received these, each piece of the management information (see FIG. 18) is updated (step S404).

<Communication Performance Control Process by Management Computer>

Figure 25:
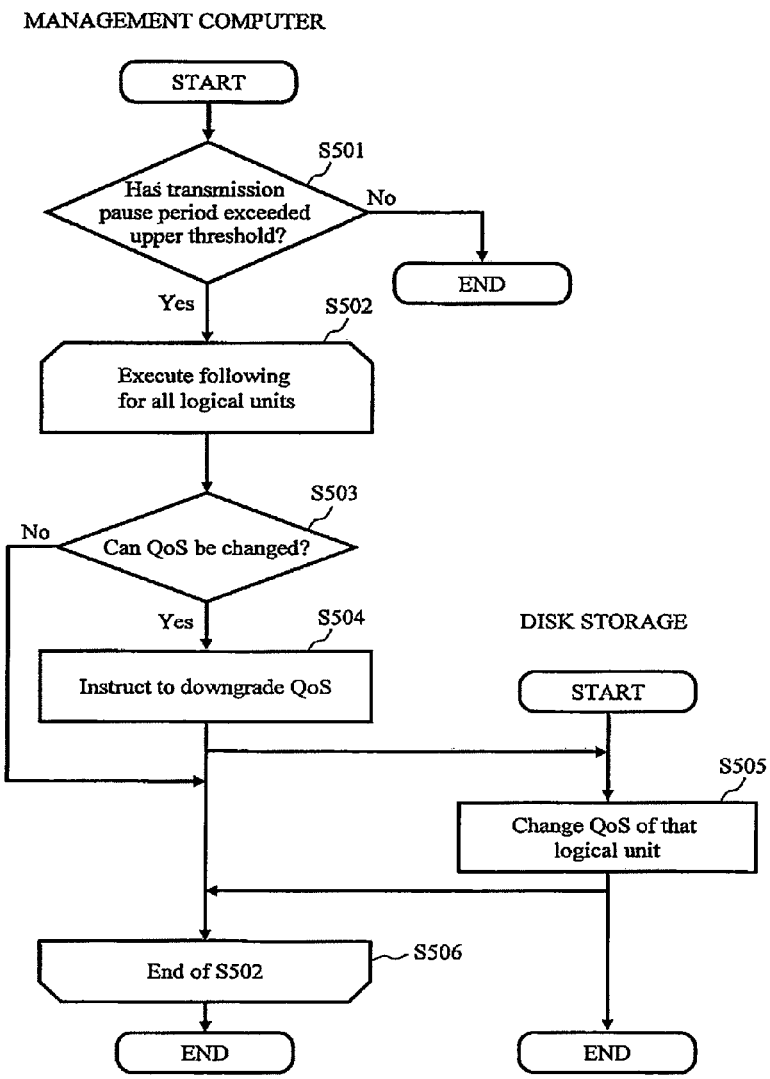
FIG. 25 is a flowchart (1) for illustrating a communication service level control process.

FIG. 25 is a flowchart for illustrating a communication performance control process (the Communication Performance Control Program 4110) by the Management Computer 400.

The Management Computer 400 executes the following process according to the Communication Performance Control Program 4110. In other words, the Management Computer 400 first determines whether or not a transmission pause period per unit time of the Data I/O Network Interface 110 included in the Disk Storage 100 or the logical storage unit defined for the same Data I/O Network Interface 110 has exceeded the PAUSE ALERT UPPER THRESHOLD 40703 (see FIG. 19) (step S501).

Next, if the control target is the Data I/O Network Interface 110, the Management Computer 400 repeats the following process for all logical storage units defined for the above described Data I/O Network Interface 110 (step S502). It should be noted that if the control target in step 5501 is the logical storage unit, step S502 is not performed and skipped. The Management Computer 400 determines whether or not the above described determined Data I/O Network Interface or logical storage unit can change the QoS which is the communication performance thereof, based on the CONFIGURATION CHANGE AVAILABILITY 40702 (step S503). If a result of the determination is "Yes" (if information in 40702 is "TRUE"), the Management Computer 400 instructs the Disk Storage 100 to downgrade the QoS of the Data I/O Network Interface 110 or the logical storage unit which is the control target (step S504). The Disk Storage 100 which has received the same instruction decreases a value of the QUALITY OF SERVICE DEFINITION 10505 so that a service level of the Data I/O Network Interface 110 or the logical storage unit which is the target is degraded (step S505). As a decreasing method, a constant value may be subtracted from the QUALITY OF SERVICE DEFINITION 10505, or the QUALITY OF SERVICE DEFINITION 10505 may be thinned by a constant percentage (for example, the QUALITY OF SERVICE DEFINITION 10505 is multiplied by 0.9 so as to be thinned by 10%).

Figure 26:
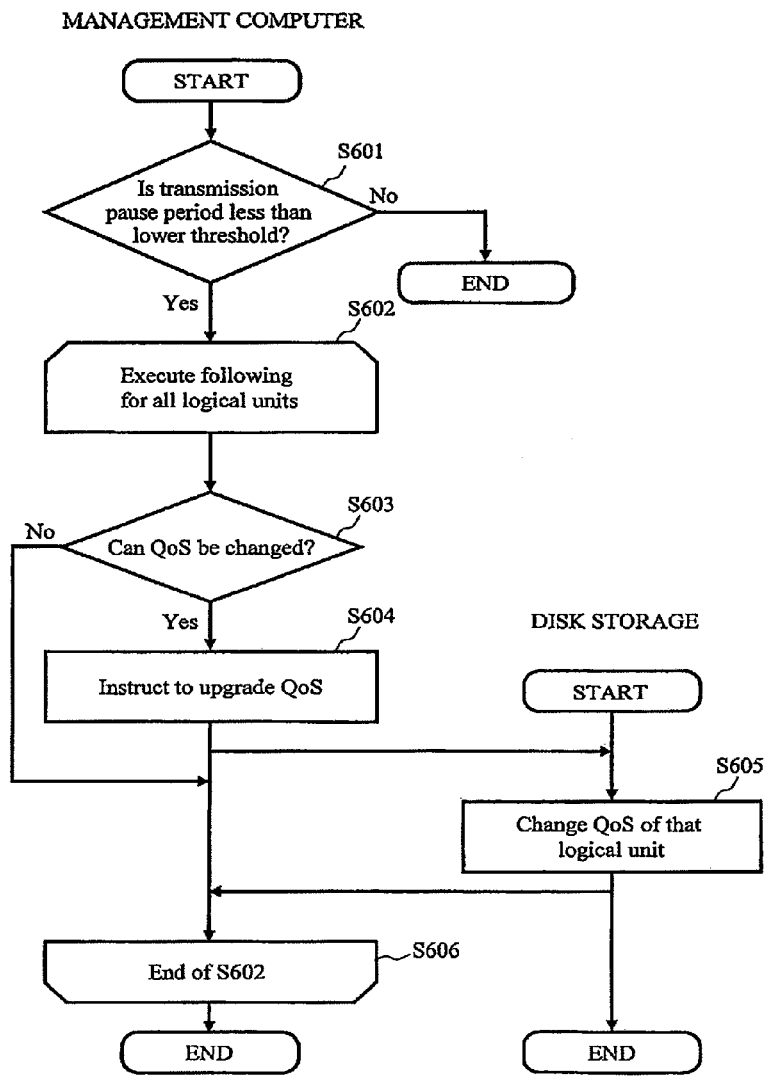
FIG. 26 is a flowchart (2) for illustrating the communication service level control process.
Figure 27:
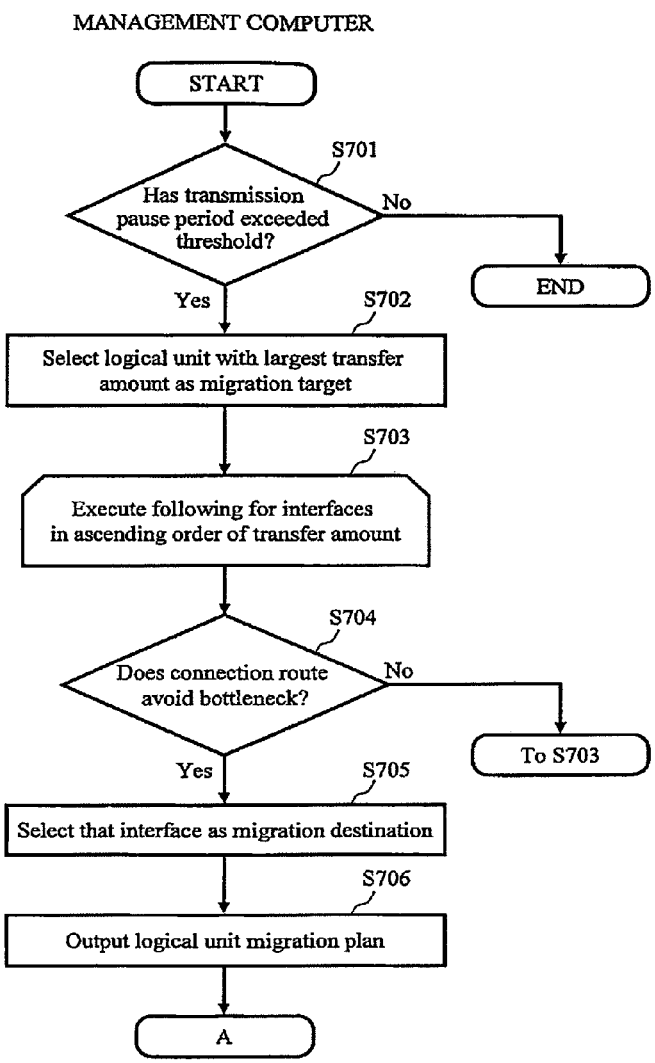
FIG. 27 is a flowchart (1) for illustrating a logical storage unit migration process.
Figure 28:
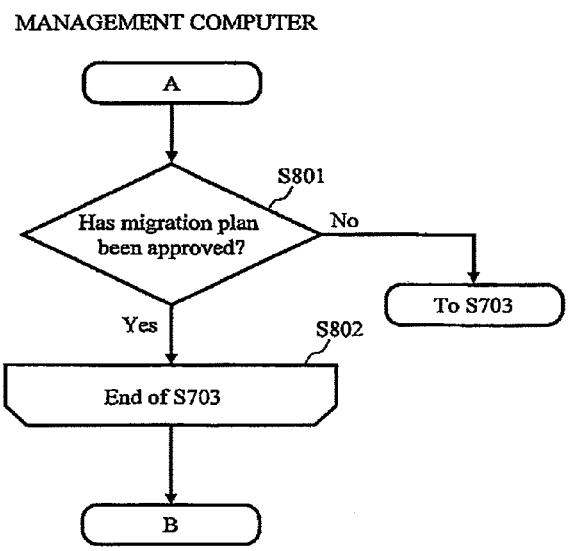
FIG. 28 is a flowchart (2) for illustrating the logical storage unit migration process.
Figure 29:
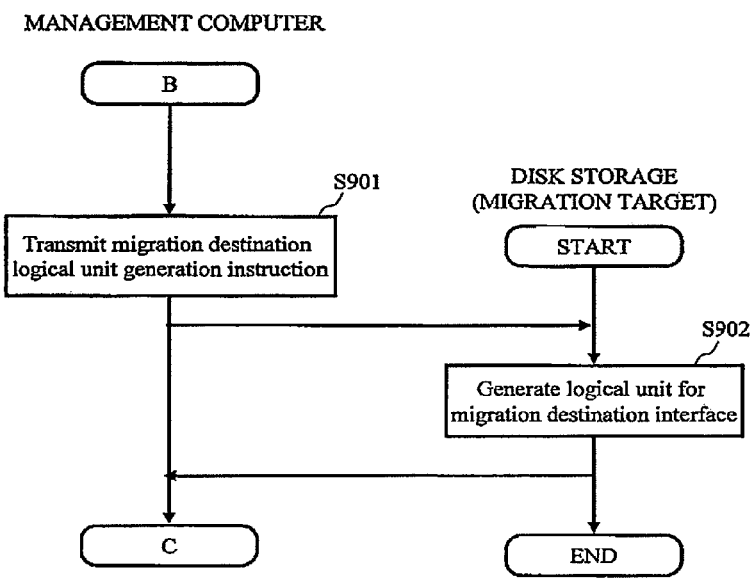
FIG. 29 is a flowchart (3) for illustrating the logical storage unit migration process.
Figure 30:
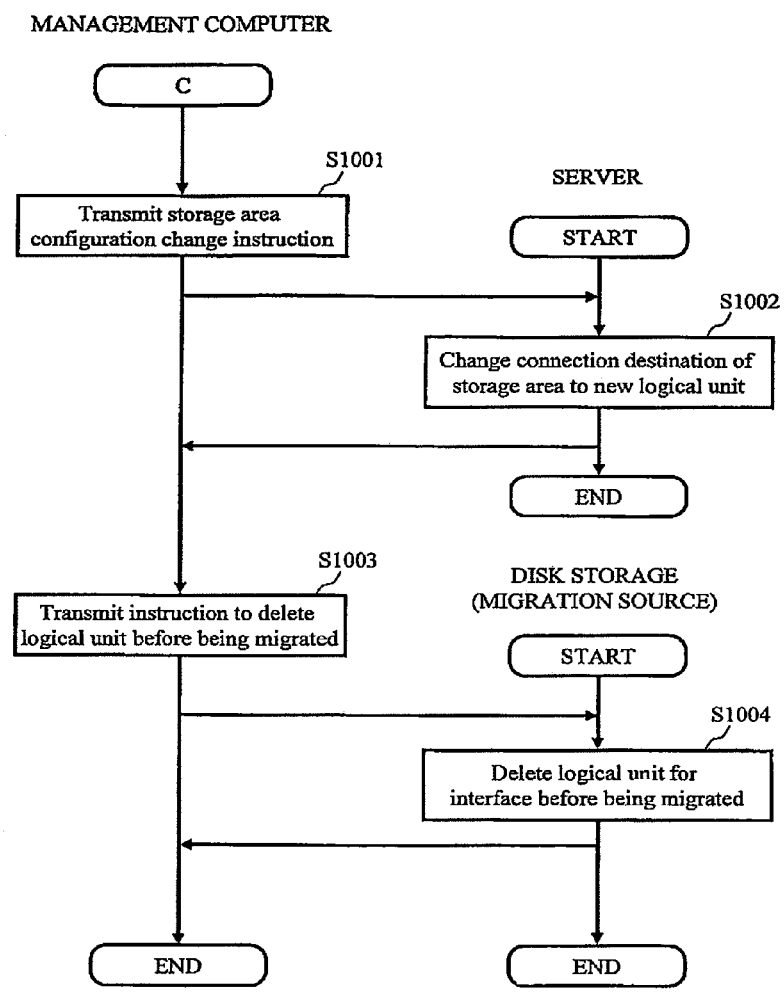
FIG. 30 is a flowchart (4) for illustrating the logical storage unit migration process.

FIG. 26 is a flowchart for illustrating another communication performance control process by the Management Computer 400. Although the same process is almost similar to FIG. 25, the same process is different in that the PAUSE ALERT LOWER THRESHOLD 40704 is determined in step S601, and that the upgrade of the QoS is instructed in step 5604.

According to the above described processes, a traffic amount in the Data I/O Network Interface 110 or the logical storage unit with a large amount of the sent-out data can be properly controlled. As a result thereof, frequent occurrence of the PAUSE control process in these can be avoided.

(2) SECOND EMBODIMENT

Hereinafter, operations of the storage system according to a second embodiment will be described. In the second embodiment, a process for switching a route between the logical storage unit with a large data transfer amount, which has become a bottleneck, and the Server, to another route is performed.

<Migration (Switching) Process for Connection Relationship of Logical Storage Unit with Data I/O Network Interface>

FIGS. 27 to 30 are flowcharts for illustrating a process for migrating a logical storage unit defined for a first Data I/O Network Interface 110A to a second Data I/O Network Interface 110B (operations of the Storage Area Configuration Calculation Program 4080 and the Storage Area Configuration Change Instruction Program 4090). The Processor Unit 470 in the Management Computer 400 executes the process of FIG. 27 according to the Storage Area Configuration Calculation Program 4080. In other words, the Processor Unit 470 first determines whether or not the transmission pause period per unit time of the Data I/O Network Interface 110A included in the Disk Storage 100 or the logical storage unit defined for the same Data I/O Network Interface 110A has exceeded the PAUSE ALERT UPPER THRESHOLD 40703 (step S701).

At this time, if a determination target is the Data I/O Network Interface 110A, the Processor Unit 470 selects the Logical Storage Unit 180A with a largest data transfer amount, among logical storage units defined for the above described Data I/O Network Interface 110A, as a migration target (step S702). It should be noted that if the determination target in step S701 is the logical storage unit, the Processor Unit 470 automatically selects the same Logical Storage Unit 180A as the migration target.

Subsequently, the Processor Unit 470 repeats the following for all Data I/O Network Interfaces 110 included in the above described Disk Storage 100 (step S703). In other words, the Processor Unit 470 determines whether or not the connection to the Server 200 is enabled via a route not through the Data I/O Network Interface 310 of the Network Connection Unit 300 which has issued the PAUSE control since its data sending-out performance has not caught up, by migrating the above described Logical Storage Unit 180A to the Data I/O Network Interface 110B selected in step 5703 (step S704). This determination process can be executed, for example, by a method disclosed in Patent Citation 2.

Figure 34:
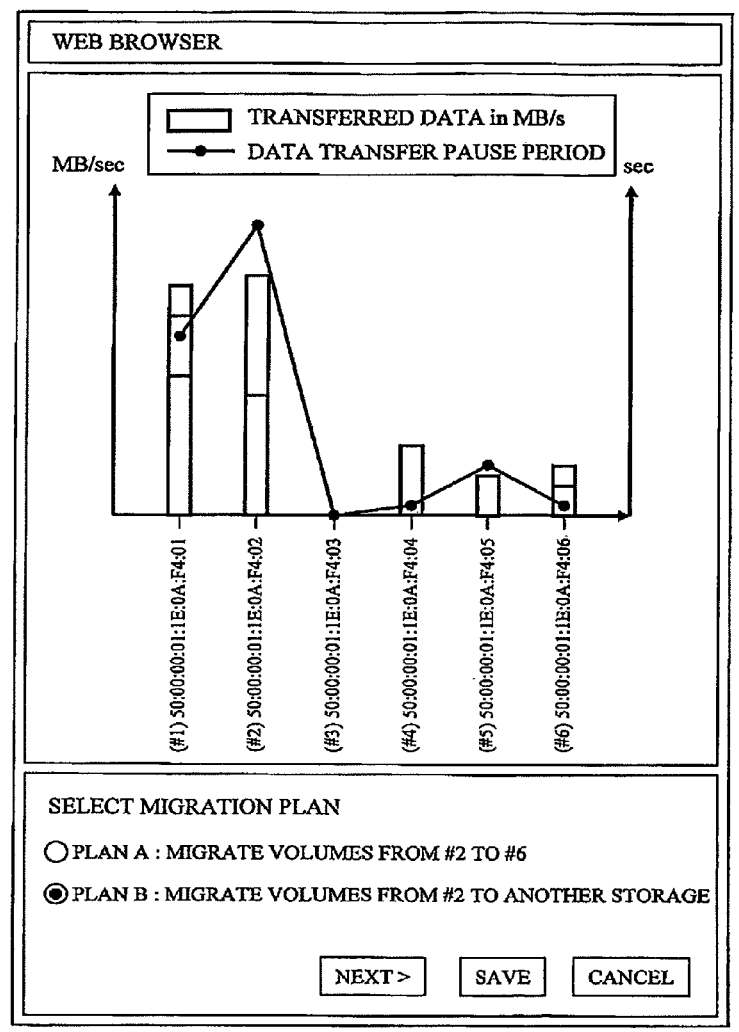
FIG. 34 is a diagram showing a migration plan confirmation screen (GUI) example.

If a result of the determination in step S704 is "Yes", the Processor Unit 470 selects the above described Data I/O Network Interface 110B as a migration destination (step S705). Furthermore, in order to cause the manager to approve the same migration plan, the Management Computer 400 may display the same logical storage unit migration plan on a user interface (step S706). It should be noted that a GUI for the output and the approval is, for example, as shown in FIG. 34.

If this migration plan has been approved by the manager (Yes in step S801 of FIG. 28), a subsequent migration process (FIGS. 29 and 30) is continued.

Furthermore, the Processor Unit 470 executes the following process (FIGS. 29 and 30) according to the Storage Area Configuration Change Instruction Program 4090. In other words, the Processor Unit 470 instructs to define a logical storage area constituting the migration target Logical Storage Unit 180A which has already been defined for the first Data I/O Network Interface 110A, also in a Logical Storage Unit 180F for the second Data I/O Network Interface 110B (step S901).

In the Disk Storage 100 which has received the same instruction, the Logical Storage Unit 180F is defined for the second Data I/O Network Interface 110B which is the migration destination (step S902).

Furthermore, according to the Storage Area Configuration Change Instruction Program 4090, the Processor Unit 470 instructs to replace the Logical Storage Unit 180A which has been used by the Server 200 as the storage area, with the new Logical Storage Unit 180F generated in step S902 (step S1001).

In the Server 200 which has received the instruction, the connection destination of the mount point of the above described storage area is changed to the migration destination Logical Storage Unit 180F in the instruction (step S1002).

Next, according to the Storage Area Configuration Change Instruction Program 4090, the Processor Unit 470 instructs the Disk Storage 100 to delete the Logical Storage Unit 180A selected as the migration target in steps S701 and 5702 (step S1003).

In the Disk Storage 100 which has received this, the migration target Logical Storage Unit 180A is deleted according to the request (step S1004).

According to the above process, an arrangement of the logical storage units can be changed so that the Data I/O Network Interface 310 which sends out the data and is a generation source of the PAUSE process is not gone through. Moreover, according to the same process, without adding changes to the configuration of the network, only configuration changes on the storage side can avoid a performance bottleneck.

The example of FIG. 1 will be described. For example, if a Data I/O Network Interface 310A1 included in the Network Connection Unit 300A has become a bottleneck and has become a cause of the PAUSE control, the Logical Storage Unit 180A defined for the Data I/O Network Interface 110A, with respect to which the Server 200A performs the input and the output from the Data I/O Network Interface 210A1, is defined for a Data I/O Network Interface 110A3. Thereby, after the connection relationship has been changed, the Server 200 performs the input and the output via a route through a Data I/O Network Interface 210A2, and the above described bottleneck of the Data I/O Network Interface 310A1 is eliminated.

(3) THIRD EMBODIMENT

In a third embodiment, at the time of the migration of the logical storage unit between the Data I/O Network Interfaces, the logical storage area constituting the migration target logical storage unit is not changed to be attached to the migration destination Data I/O Network Interface 110B, as in steps 5901 and S902 in the second embodiment. The third embodiment relates to a process for defining a new logical storage area in the logical storage unit for the migration destination Data I/O Network Interface 110B, and copying the data from a migration source.

<Process for Copying Data in Migration Source Logical Storage Unit and Subsequently Switching Connection Relationship with Data 110 Network Interface>

Figure 31:
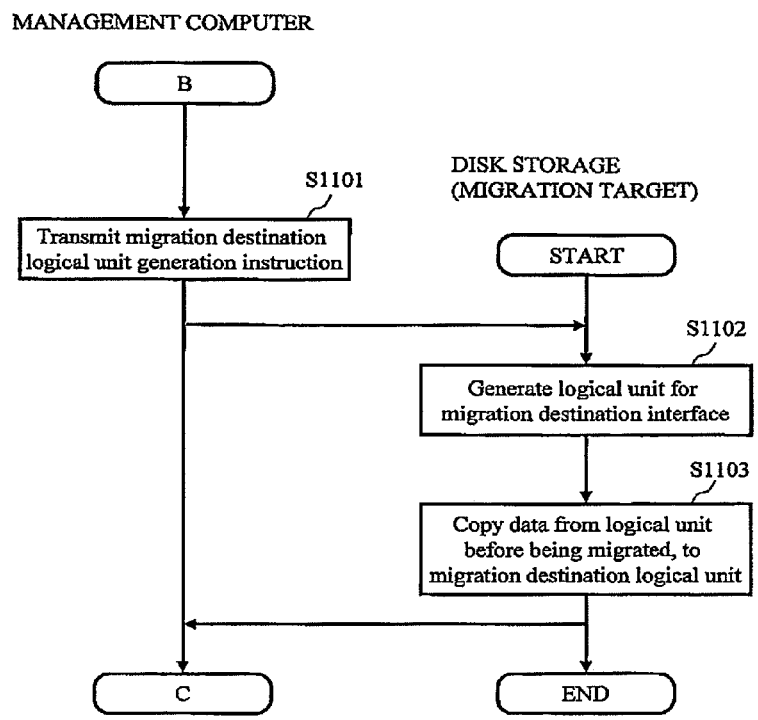
FIG. 31 is a flowchart for illustrating a logical storage unit copy process.

FIG. 31 is a flowchart for illustrating the a process for defining the new logical storage area in the logical storage unit for the migration destination Data I/O Network Interface 110B, and copying the data from the migration source (operations of the Storage Area Configuration Change Instruction Program 4090).

According to the Storage Area Configuration Change Instruction Program 4090, the Processor Unit 470 instructs to generate a logical storage unit using a second logical storage area, for the migration destination Data I/O Network Interface 110B (step S1101).

In the Disk Storage 100 which has received this, the logical storage unit in the instruction is generated for the migration destination Data I/O Network Interface 110B (step S1102). Moreover, the data is copied from the Logical Storage Unit 180A using a first logical storage area before being migrated, to a Logical Storage Unit 180G using the above described second logical storage area (a new LU: not shown) (step S1103).

According to the above described process, in combination with an effect of the second embodiment, the migration to the Logical Storage Unit 180G using another storage area is enabled. This is also a practice procedure which enables the migration of the Logical Storage Unit 180 from the first Disk Storage 100 to the second Disk Storage 100.

Although the connection relationship (path) within the same Disk Storage can be switched, it is difficult to switch the path in the case of physically different Disk Storages. Therefore, the copy process as in the present embodiment is effective.

Hence, the processes in the second and third embodiments can be switched and used depending on the configuration of the Disk Storages.

(4) FOURTH EMBODIMENT

A fourth embodiment relates to a connection relationship switching process in the case where the Logical Storage Unit 180 defined for the first Disk Storage 100 is used as a virtual volume run by the second Disk Storage 100.

<Process for Switching Connection Relationship of Logical Storage Unit in Virtualization>

Figure 32:
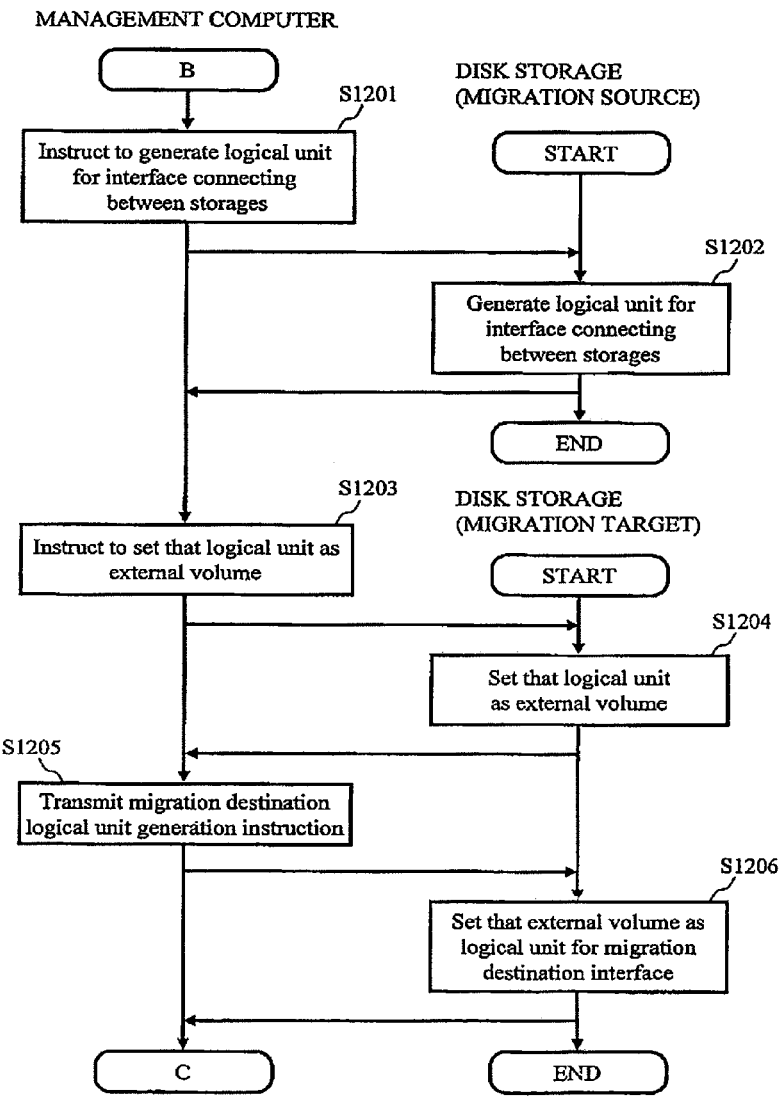
FIG. 32 is a flowchart for illustrating a logical storage unit migration process between Disk Storage apparatuses.

FIG. 32 is a flowchart for illustrating a process for enabling the migration (the switching (change) of the connection relationship) of the Logical Storage Unit 180 without performing the data copy process between the apparatuses (operations of the Storage Area Configuration Change Instruction Program 4090).

According to the Storage Area Configuration Change Instruction Program 4090, the Processor Unit 470 instructs the first Disk Storage 100 to define the Logical Storage Unit 180B for a Data I/O Network Interface 110A4, which connects the Disk Storage 100 and the second Disk Storage 100, of the migration target Logical Storage Unit 180 defined for the Storage 100 (step S1201).

The first Disk Storage 100 which has received this defines a logical storage area constituting the above described migration target Logical Storage Unit 180, as the new Logical Storage Unit 180B, for the Data I/O Network Interface 110A4 connecting between the designated Disk Storages 100 (step S1202).

Next, according to the Storage Area Configuration Change Instruction Program 4090, the Processor Unit 470 refers to the Logical Storage Unit 180B generated in step S1202, from the second Disk Storage 100, and instructs the second Disk Storage 100 to cause the Logical Storage Unit 180B to correspond to a virtual volume 180E (step S1203).

The second Disk Storage 100 which has received this updates the Logical Storage Area Configuration Information 1030 so that the Logical Storage Unit 180D is caused to correspond to the logical storage area (step S1204).

Subsequently, according to the Storage Area Configuration Change Instruction Program 4090, the Processor Unit 470 instructs the second Disk Storage 100 to define the logical storage area defined in step S1204, in the Logical Storage Unit 180E which can be referred to by the Server 200 (step S1205).

The second Disk Storage 100 which has received this sets the logical storage area generated in step S1204, in the Logical Storage Unit 180E for a Data I/O Network Interface 110B1 (step S1206).

According to the above described process, the migration of the logical storage unit to another Disk Storage 100 is enabled by using a virtual volume function operated by the second Disk Storage 100. According to the same practice procedure, the migration of the logical storage unit between the Disk Storages 100 is enabled without performing the data copy.

<Virtual Volume Configuration Diagram after Process of FIG. 32>

Figure 33:
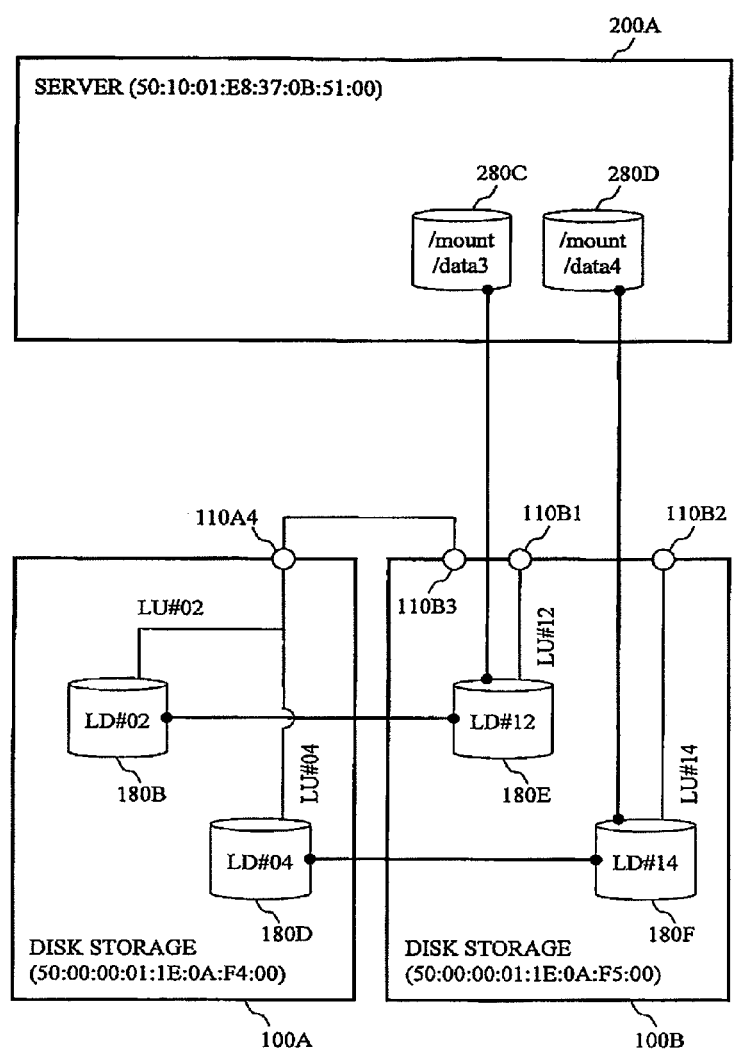
FIG. 33 is a diagram showing a virtual storage system logical configuration.

FIG. 33 is a diagram showing a virtual volume configuration diagram after the process of FIG. 32 has been executed. In FIG. 33, physically, the Logical Storage Areas 180E and 180F denote virtual volumes instead of storage resources included in a Disk Storage 100B.

Logical Storage Units LD#02 and LD#04 stored in the Disk Storage 100A correspond to substance of the same virtual volumes. In other words, when the Data Input/Output Program 2010 performs data reading and writing which have been executed with respect to Storage Areas 280C and 280D, the Data Input/Output Program 2010 tries to perform the input and output process with respect to the Logical Storage Areas 180E and 180F. Furthermore, the Disk Storage 100B executes an input and output request with respect to the same Logical Storage Areas 180E and 180F, with respect to the Logical Storage Units 180B and 180D provided by the Disk Storage 100A.

The example of FIG. 1 will be described. For example, if the Data I/O Network Interface 310A1 included in the Network Connection Unit 300A has become the bottleneck and has become the cause of the PAUSE control, the Logical Storage Unit 180B defined for the Data I/O Network Interface 110A, with respect to which the Server 200A performs the input and the output from the Data I/O Network Interface 210A1, is defined for the Data I/O Network Interface 110A4, and further associated with the virtual volume in the Disk Storage 100B. Furthermore, the same virtual volume is defined for the Data I/O Network Interface 110B1. Thereby, subsequently, the Server 200 performs the input and the output via the route through the Data I/O Network Interface 210A2, and the above described bottleneck of the Data I/O Network Interface 310A1 can be eliminated.

(5) CONCLUSION

In the storage system according to the present invention, the storage apparatus has the cache memory (temporary storage area) for temporarily accumulating the transfer data, and the FCOE-enabled I/O interface. In addition, the I/O interface is connected to the network connection unit. In the storage system having such a configuration, if the amount of the data accumulated in the buffer memory has become greater than or equal to a predetermined value, the network connection unit transmits a data transfer pause request to the storage apparatus. On the other hand, in response to the data transfer pause request, the storage apparatus causes the data transfer to pause, and also, if the amount of the data transferred from the storage area to the cache memory has become a predetermined value, the storage apparatus causes the data read-ahead process with respect to the cache memory to pause. In this way, the PAUSE command which is a specification of the Ethernet (registered trademark) can be properly processed. Moreover, since not only the pause of the data transfer from the storage apparatus, but also the read-ahead process with respect to the cache memory are properly controlled by the PAUSE control, a situation in which a free space of the cache memory is consumed more than necessary and degradation of reading performance is caused can be avoided. It should be noted that not only the storage apparatus but also the network connection unit or the server may have the FCOE-enabled I/O interface as the communication interface.

The network connection unit detects which FCOE-enabled I/O interface of which logical storage area has the largest data transfer amount, and transmits the data transfer pause request to the storage apparatus (100). Then, in response to the transfer pause request, the storage apparatus causes the data transfer from the I/O interface indicating the largest data transfer amount to pause, and also causes the data read-ahead process from the logical storage area associated with the I/O interface indicating the largest data transfer amount to pause, if the amount of the data in the cache memory has become a predetermined amount. In this way, based on the connection relationship between each logical storage area and each FCOE-enabled I/O interface, the data transfer and the reading of the data into the cache memory can be properly adjusted.

It should be noted that if the amount of the data accumulated in the buffer has become less than the predetermined value, the network connection unit transmits a data transfer restart request to the storage apparatus, and thereby, the storage apparatus can restart the data transfer at a proper timing.

Furthermore, the QoS (Quality of Service) of the storage apparatus is changed based on, a length of a transfer pause period. More specifically, if the pause period is longer than the upper threshold, the QoS is controlled to be degraded, and if the pause period is shorter than the lower threshold, the QoS is controlled to be upgraded. Thereby, the amount and a speed of the data transfer can be properly controlled.

Moreover, if the length of the transfer pause period has exceeded a predetermined value, a connection correspondence relationship between the logical storage area and the I/O interface is changed. Thereby, the data transfer from the I/O interface which has become the bottleneck can be switched to another route to mitigate congestion in the data transfer. On this occasion, the management computer (400) may contain a GUI (Graphical User Interface) for displaying a change plan for the connection relationship on a screen and receiving an approval from a user.

As another aspect, if the length of the transfer pause period has exceeded the predetermined value, when the connection correspondence relationship between the logical storage area with the largest data transfer amount and the I/O interface is changed, the copy of the data in that logical storage area with the largest data transfer amount is stored in the new logical storage area, and the new logical storage area in which the copy has been stored is connected to another I/O interface. Thereby, the route can also be changed to a physically different storage apparatus.

Furthermore, an external storage apparatus may be provided, and an original existing storage apparatus may function as a virtualized volume of the external storage apparatus. It should be noted that a process for virtualizing the original storage apparatus changes the setting and the connection relationship in the above described original storage apparatus so that the above described original storage apparatus functions as the virtualized volume of the external storage apparatus, based on a setting command from the management computer. In this way, even after the storage system has been constructed, the virtualization can be easily realized.

It should be noted that the present invention can also be realized by a program code of software which realizes the functions of the embodiments. In this case, a storage medium having recorded therein the program code is provided to a system or an apparatus, and a computer (or a CPU or an MPU) in the system or the apparatus reads the program code stored in the storage medium. In this case, the program code itself read from the storage medium realizes the functions of the above described embodiments, and the program code itself and the storage medium having stored therein the program code constitute the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, a ROM or the like is used.

Moreover, based on an instruction of the program code, an OS (operating system) running on the computer or the like may perform some or all of actual processes, and the functions of the above described embodiments may be realized by those processes. Furthermore, after the program code read from the storage medium is written in the memory on the computer, based on the instruction of the program code, the CPU or the like of the computer may perform some or all of the actual processes, and the functions of the above described embodiments may be realized by those processes.

Moreover, the program code of the software which realizes the functions of the embodiments may be delivered via the network, and thereby stored in storage means such as the hard disk or the memory in the system or the apparatus, or the storage medium such as a CD-RW or the CD-R, and at the point of use, the computer (or the CPU or the MPU) in the system or the apparatus may read the program code stored in the above described storage means or the above described storage medium and execute the program code.

What is claimed is:

1. A storage apparatus, which is connected to a plurality of external apparatuses so as to perform data transmission to the plurality of external apparatus and data reception from the plurality of external apparatuses using Fiber Channel over Ethernet (FCOE), the storage apparatus comprising:
   a plurality of storage areas for storing data;
   a temporary storage area for temporarily accumulating transmission data read from the plurality of storage areas;
   a plurality of FCOE-enabled I/O (input/output) interfaces, the plurality of I/O interfaces being connected to the plurality of external apparatuses so as to perform data transmission and reception with the plurality of external apparatuses; and
   a controller for controlling data transmission and reception performed by the plurality of I/O interfaces,
   wherein each of the plurality of external apparatuses comprises a buffer memory for temporarily accumulating data transmitted from the storage apparatus, monitors an amount of data accumulated in the buffer memory, and transmits a data transmission pause request to the storage apparatus if the amount of data accumulated in the buffer memory has become greater than or equal to a predetermined value, and wherein in response to reception of the data transmission pause request by one of the plurality of I/O interfaces, the controller causes data transmission to the external apparatuses that have transmitted the data transmission pause request to pause.

2. The storage apparatus according to claim 1, wherein if the amount of data accumulated in the temporary storage area has become equal to a predetermined value when, after the pause of data transmission to the external apparatuses, a read-ahead process in which transmission data are read ahead from the storage areas so as to be accumulated in the temporary storage area is being executed, the controller causes the data read-ahead process to pause.

3. The storage apparatus according to claim 1,
wherein if an amount of data accumulated in the buffer memory has become less than a predetermined value, the external apparatuses that have transmitted the data transmission pause request transmits a data transmission restart request to the storage apparatus, and wherein in response to reception of the data transmission restart request by one of the I/O interfaces, the controller restarts data transmission to the external apparatuses that have transmitted the data transmission restart request.

4. The storage apparatus according to claim 1, further comprising:
a management interface to be connected to a management computer, wherein the management computer transmits a control signal for instructing a change in QoS (Quality of Service) of one of the plurality of I/O interfaces, based on a length of a data transmission pause period of each of the plurality of I/O interfaces of the storage apparatus, to the storage apparatus, and wherein in response to reception of the control signal by the management interface, the controller changes the QoS of the I/O interface as instructed by the control signal.

5. The storage apparatus according to claim 4,
wherein if the data transmission pause period of one of the plurality of I/O interfaces becomes greater than a predetermined value, the management computer transmits a control signal for instructing to downgrade the QoS of one of the I/O interfaces to the storage apparatus, and wherein the controller downgrades the QoS of one of the I/O interfaces according to the control signal.

6. The storage apparatus according to claim 4,
wherein if the data transmission pause period of one of the plurality of I/O interfaces becomes less than a predetermined value, the management computer transmits a control signal for instructing to upgrade the QoS of one of the I/O interfaces to the storage apparatus, and wherein the controller upgrades the QoS of one of the I/O interfaces according to the control signal.

7. A storage apparatus, which is connected to a plurality of external apparatuses so as to perform data transmission to the plurality of external apparatuses and data reception from the plurality of external apparatuses using Fiber Channel over Ethernet (FCOE), the storage apparatus comprising:
a plurality of storage areas for storing data;
a temporary storage area for temporarily accumulating transmission data read from the plurality of storage areas;
a plurality of FCOE-enabled I/O (input/output) interfaces associated with the plurality of storage areas, the plurality of I/O interfaces being connected to the plurality of external apparatuses so as to perform data transmission and reception with the plurality of external apparatuses; and a controller for controlling data transmission and reception performed by the plurality of I/O interfaces, wherein each of the plurality of external apparatuses comprises a buffer memory for temporarily accumulating data transmitted from the storage apparatus, monitors an amount of data accumulated in the buffer memory, and transmits a data transmission pause request to the storage apparatus if the amount of data accumulated in the buffer memory has become greater than or equal to a predetermined value, and wherein in response to reception of the data transmission pause request by one of the plurality of I/O interfaces, the controller causes data transmission to the external apparatuses that have transmitted the data transmission pause request to pause.

8. The storage apparatus according to claim 7, wherein if the amount of data accumulated in the temporary storage area has become equal to a predetermined value when, after the pause of data transmission to the external apparatus, a read-ahead process in which transmission data are read ahead from one of the plurality of storage areas so as to be accumulated in the temporary storage area is being executed, the controller causes the data read-ahead process to pause.

9. The storage apparatus according to claim 7,
wherein if an amount of data accumulated in the buffer memory has become less than a predetermined value, the external apparatuses that have transmitted the data transmission pause request transmits a data transmission restart request to the storage apparatus, and wherein in response to reception of the data transmission restart request by one of the I/O interfaces, the controller restarts data transmission to the external apparatuses that have transmitted the data transmission restart request.

10. The storage apparatus according to claim 7, further comprising:
a management interface to be connected to a management computer, wherein the management computer transmits a control signal for instructing a change in QoS (Quality of Service) of one of the plurality of storage areas, based on a length of a data transmission pause period of each of the plurality of storage areas of the storage apparatus, to the storage apparatus, and wherein in response to reception of the control signal by the management interface, the controller changes the QoS of the storage area as instructed by the control signal.

11. The storage apparatus according to claim 7, further comprising:
a management interface to be connected to a management computer, wherein if the data transmission pause period of one of the plurality of storage areas of the storage apparatus becomes greater than a predetermined value, the management computer transmits a control signal for instructing a change in a correspondence relationship between one of the storage areas and an I/O interface associated with the one of the storage areas to the storage apparatus, and wherein in response to reception of the control signal by the management interface, the controller associates the one of the storage areas with a different I/O interface according to the control signal.

12. The storage apparatus according to claim 7, further comprising:
- a management interface to be connected to a management computer,
- wherein if the data transmission pause period of one of the plurality of I/O interfaces of the storage apparatus becomes greater than a predetermined value, the management computer transmits a control signal for instructing a change in a correspondence relationship between one of the I/O interfaces and a storage area associated with the one of the I/O interfaces to the storage apparatus, and
- wherein in response to reception of the control signal by the management interface, the controller associates the one of the storage areas with a different I/O interface according to the control signal.

13. The storage apparatus according to claim 12,
- wherein the management computer transmits a control signal for instructing a change in a correspondence relationship between one of the I/O interfaces and a storage area associated with the one of the I/O interfaces to the storage apparatus, the storage area indicating the largest data transmission amount among one or more storage areas, and
- wherein in response to reception of the control signal by the management interface, the controller associates the storage area indicating the largest data transmission amount with a different I/O interface according to the control signal.

* * * * *